US011301309B2

(12) United States Patent
Shafi et al.

(10) Patent No.: US 11,301,309 B2
(45) Date of Patent: Apr. 12, 2022

(54) APPARATUSES, METHODS, AND SYSTEMS FOR PROCESSOR NON-WRITE-BACK CAPABILITIES

(71) Applicant: Intel Corporation, Santa Clara, CA (US)

(72) Inventors: Hisham Shafi, Akko (IL); Vedvyas Shanbhogue, Austin, TX (US); Gilbert Neiger, Portland, OR (US); James A. Coleman, Mesa, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/586,028

(22) Filed: Sep. 27, 2019

(65) Prior Publication Data

US 2021/0096930 A1 Apr. 1, 2021

(51) Int. Cl.
| | | |
|---|---|---|
| *G06F 9/52* | (2006.01) | |
| *G06F 9/30* | (2018.01) | |
| *G06F 12/084* | (2016.01) | |
| *G06F 12/1009* | (2016.01) | |
| *G06F 13/16* | (2006.01) | |
| *G06F 12/0804* | (2016.01) | |
| *G06F 12/0868* | (2016.01) | |

(Continued)

(52) U.S. Cl.
CPC .......... *G06F 9/526* (2013.01); *G06F 9/30101* (2013.01); *G06F 12/084* (2013.01); *G06F 12/1009* (2013.01); *G06F 13/1668* (2013.01); *G06F 2212/1032* (2013.01)

(58) Field of Classification Search
CPC .... G06F 9/526; G06F 9/30101; G06F 12/084; G06F 12/1009; G06F 13/1668
See application file for complete search history.

(56) References Cited

U.S. PATENT DOCUMENTS 5,974,508 A * 10/1999 Maheshwari ......... G06F 12/126
710/200
6,006,299 A * 12/1999 Wang ........................ G06F 9/52
710/108

(Continued)

OTHER PUBLICATIONS

Intel Corporation, "Avalon(R) Interface Specifications," Document Ref. MNL-AVABUSREF, Sep. 26, 2018, 63 pages.

(Continued)

*Primary Examiner* — Getente A Yimer
(74) *Attorney, Agent, or Firm* — Nicholson De Vos Webster & Elliott LLP

(57) ABSTRACT

Systems, methods, and apparatuses relating to processor non-write-back capabilities are described. In one embodiment, a processor includes a plurality of logical processors, a control register comprising a non-write-back lock disable bit, a cache shared by the plurality of logical processors, a bus to couple the cache to a memory to service a memory request for the memory from the plurality of logical processors, and a memory controller to disable a non-write-back lock access of the bus for a read-modify-write type of the memory request issued by a logical processor of the plurality of logical processors when the non-write-back lock disable bit is set to a first value, and implement the non-write-back lock access of the bus for the read-modify-write type of the memory request when the non-write-back lock disable bit is set to a second value.

21 Claims, 17 Drawing Sheets

(51) Int. Cl.
*G06F 9/22* (2006.01)
*G06F 9/38* (2018.01)

(56) References Cited

U.S. PATENT DOCUMENTS

| | | |
|---|---|---|
| 8,904,117 B1 | 12/2014 | Kalekar et al. |
| 9,183,145 B2 | 11/2015 | Sonnier et al. |
| 2018/0060099 A1* | 3/2018 | Shanbhogue ....... G06F 9/45558 |
| 2018/0095878 A1* | 4/2018 | Katayama ............. G06F 12/084 |

OTHER PUBLICATIONS

European Search Report and Search Opinion, EP App. No 20179236.3, dated Dec. 14, 2020, 7 pages.
Intel, "Intel(registered) 64 and IA-32 Architectures Software Developer's Manual", vol. 3A: System Programming Guide, Part 1, Order No. 253668-060US, Sep. 2016, 468 pages.

* cited by examiner

EXAMPLE TEST_CTRL FORMAT 200

| 31 | 30 | 29 | 28 | 27 | 0 |
|---|---|---|---|---|---|
| DISABLE LOCK # ASSERTION FOR SPLIT LOCK ACCESS | RESERVED | ENABLE #AC (0) EXCEPTION FOR SPLIT LOCKED ACCESSES | NON-WRITE-BACK LOCK DISABLE | | RESERVED |

REGISTER ADDRESS 202

| HEX | DECIMAL |
|---|---|
| 33H | 51 |

FIG. 2

EXAMPLE IA32_CORE_CAPABILITY FORMAT 300

| 31 | 5 | 4 | 3 | 0 |
|---|---|---|---|---|
| RESERVED | #AC (0) EXCEPTION FOR SPLIT LOCKED ACCESSES SUPPORTED | NON-WRITE-BACK LOCK DISABLE CAPABILITY | | RESERVED |

REGISTER ADDRESS 302

| HEX | DECIMAL |
|---|---|
| CFH | 207 |

FIG. 3

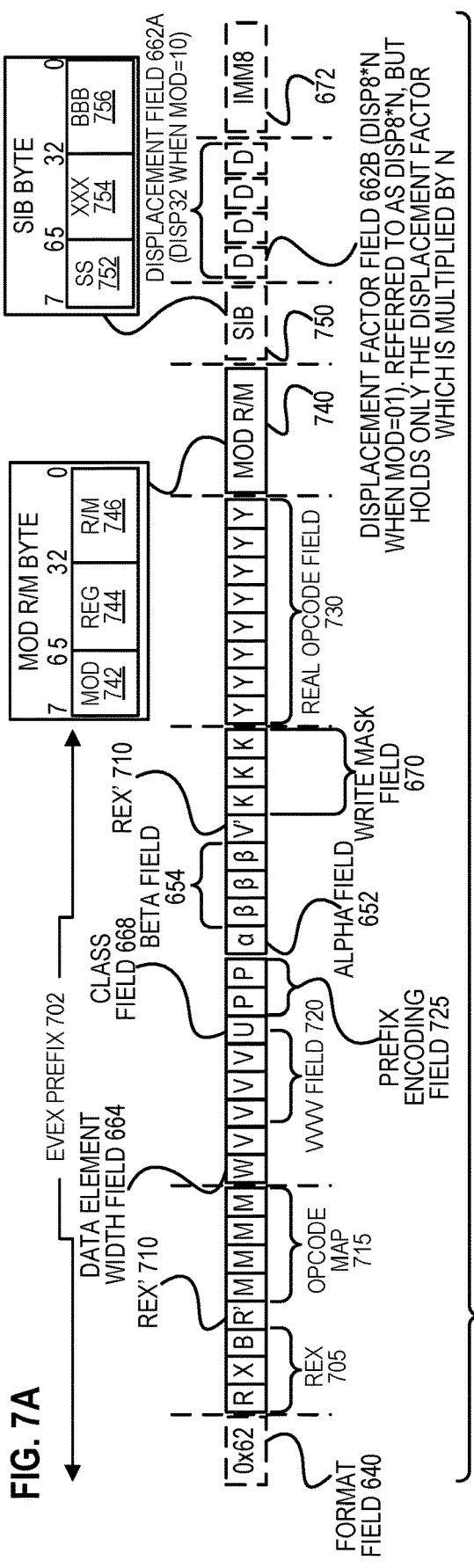
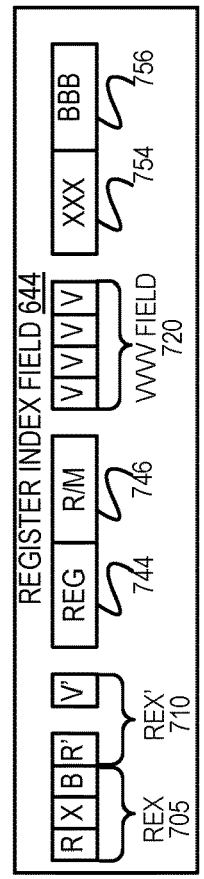
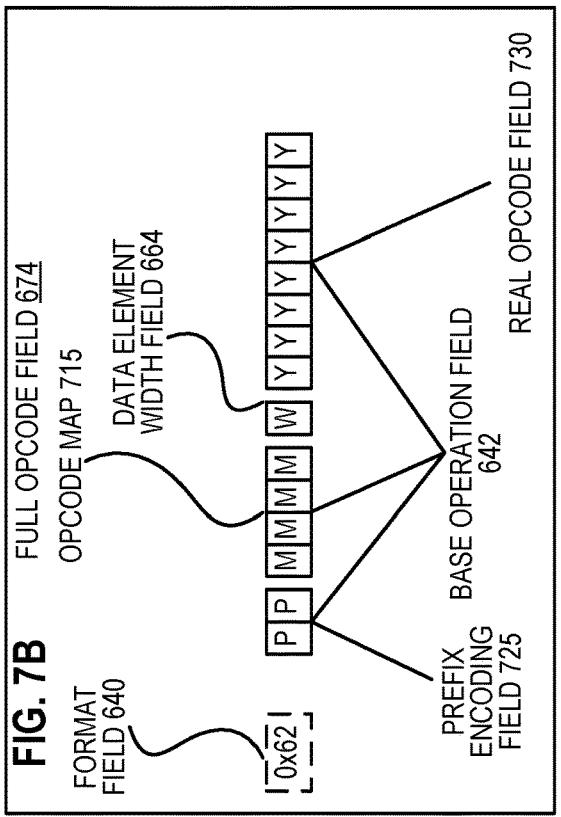

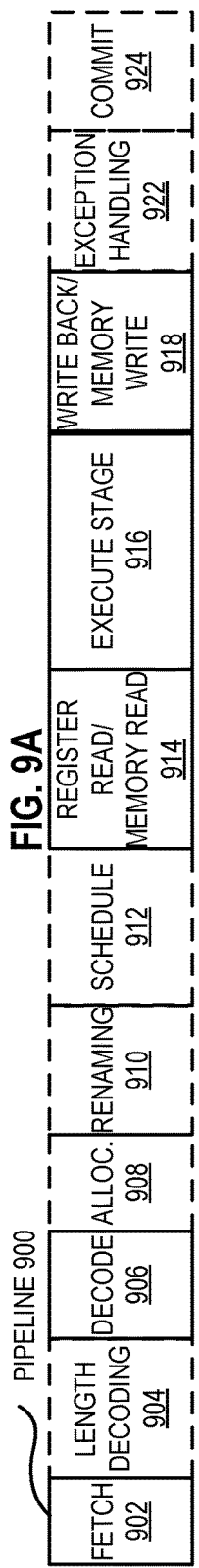
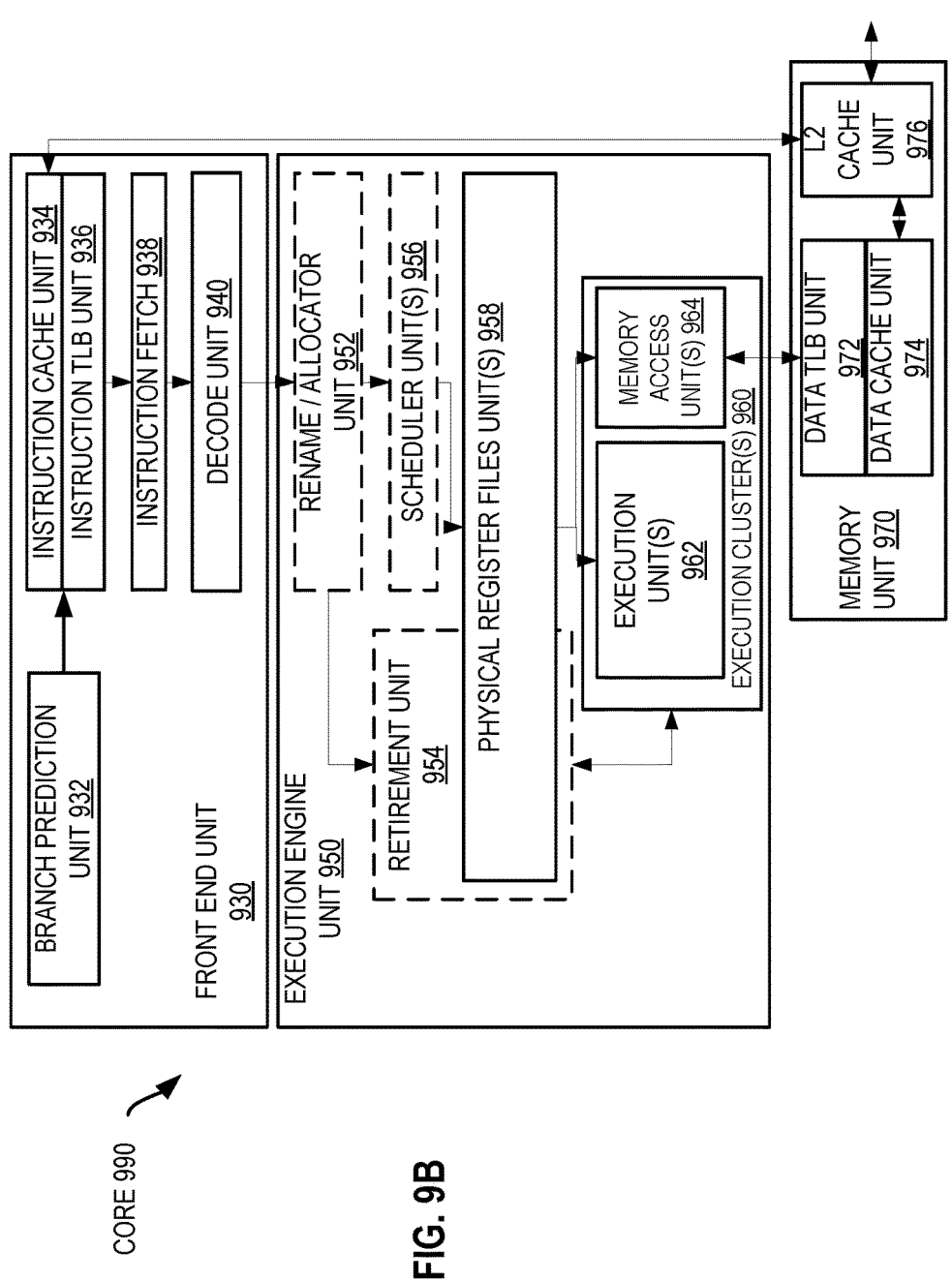
FIG. 9A
FIG. 9B

APPARATUSES, METHODS, AND SYSTEMS FOR PROCESSOR NON-WRITE-BACK CAPABILITIES

TECHNICAL FIELD

The disclosure relates generally to electronics, and, more specifically, an embodiment of the disclosure relates to a processor with non-write-back capabilities.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 2 illustrates an example format for a memory control register according to embodiments of the disclosure.

FIG. 3 illustrates an example format for a capabilities register according to embodiments of the disclosure according to embodiments of the disclosure.

FIG. 7A is a block diagram illustrating fields for the generic vector friendly instruction formats in FIGS. 6A and 6B according to embodiments of the disclosure.

FIG. 7B is a block diagram illustrating the fields of the specific vector friendly instruction format in FIG. 7A that make up a full opcode field according to one embodiment of the disclosure.

FIG. 7C is a block diagram illustrating the fields of the specific vector friendly instruction format in FIG. 7A that make up a register index field according to one embodiment of the disclosure.

FIG. 9A is a block diagram illustrating both an exemplary in-order pipeline and an exemplary register renaming, out-of-order issue/execution pipeline according to embodiments of the disclosure.

FIG. 9B is a block diagram illustrating both an exemplary embodiment of an in-order architecture core and an exemplary register renaming, out-of-order issue/execution architecture core to be included in a processor according to embodiments of the disclosure.

DETAILED DESCRIPTION

Figure 1:
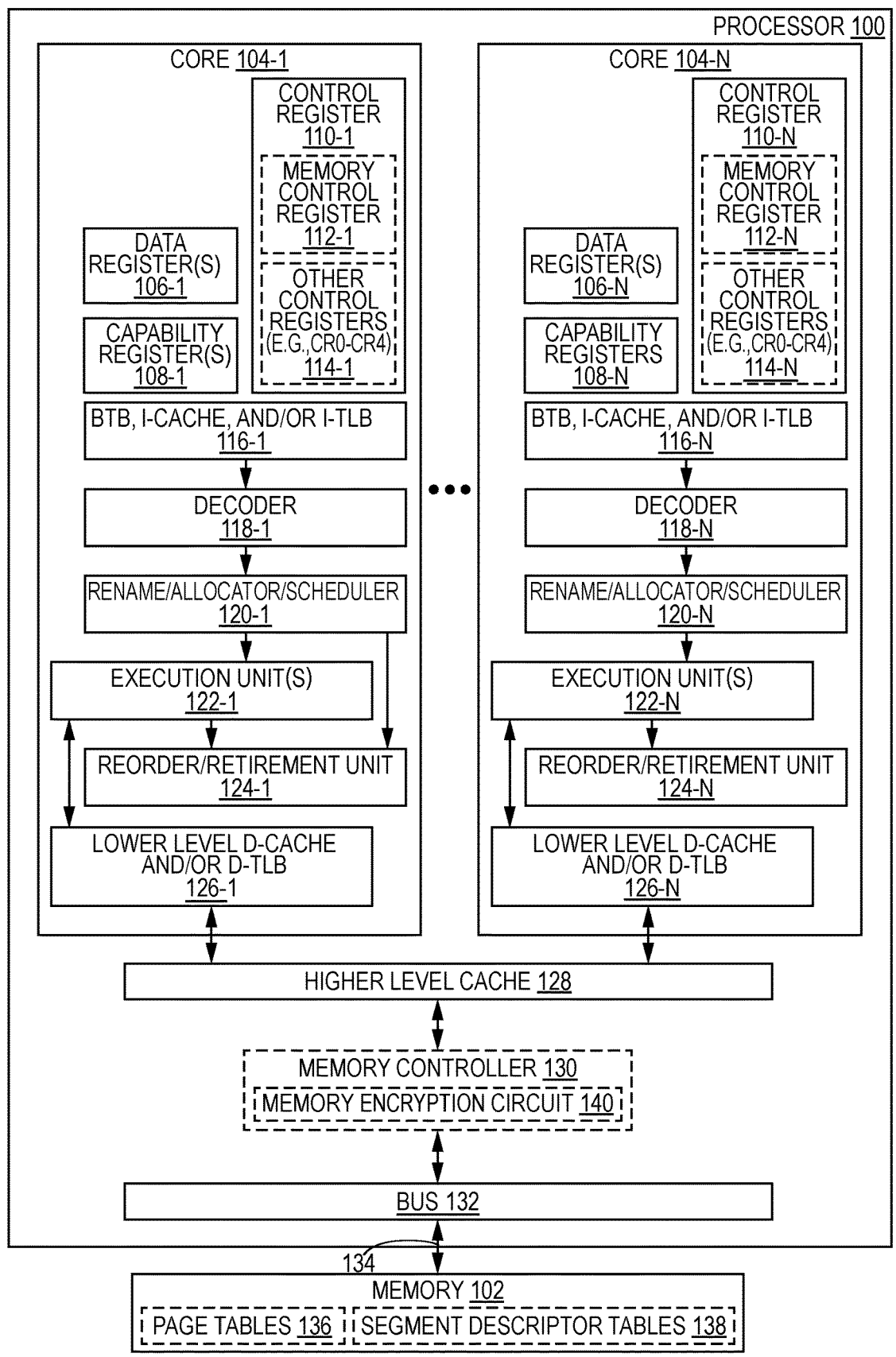
FIG. 1 illustrates a hardware processor coupled to a memory according to embodiments of the disclosure.

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A (e.g., hardware) processor (e.g., having one or more cores) may execute instructions (e.g., a thread of instructions) to operate on data, for example, to perform arithmetic, logic, or other functions. For example, software may request an operation and a hardware processor (e.g., a core or cores thereof) may perform the operation in response to the request. In certain embodiment, a logical processor or logical processors (e.g., of a central processing unit (CPU)) is to perform the operation in response to the request. A logical processor may be a core. A plurality of logical processors may be implemented on a single core, for example, where the core's components support multithreading (e.g., executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyper-Threading technology).

In certain embodiments, a plurality of logical processors performs operations. At least one of the logical processors may perform a locked read-modify-write (RMW) operation where the storage for the data to be read, then modified, the written back in its modified state, is locked from other logical processors modifying that storage during the RMW operation. As one example, a first logical processor that is to modify data (e.g., a cache line of data) is to assert a lock over the storage for that data, modifies the data (e.g., one or more bits thereof), then writes the modified version of the data back into the storage (e.g., the same location that was read from), and then deasserts the lock, e.g., to prevent another logical processor from performing a write between the read and the write by the first logical processor. Non-limiting examples of read-modify-write types of memory requests that implement a lock (e.g., a bus lock) are certain lock instructions and flows (e.g., ADD with a lock prefix, updating segment access bits, or page tables access/dirty bits).

In certain embodiments, a locked RMW operation is for data that is stored in a cache (e.g., an L1 cache) shared by a plurality of logical processors, so it only impacts software running on same logical processors that share this cache. However, in other embodiments, a non-write-back lock is implemented for an RMW type of memory request to the storage storing the data to be read and modified. In one embodiment, a non-write-back lock is implemented because the data to be read and modified is not stored within a (e.g., internal) cache of the logical processor to perform the RMW operation, but is stored in memory separate from the cache that is locked from other accesses by the non-write-back lock. For example, locking a bus that couples a plurality of logical processors to a memory.

However, in certain embodiments, the non-write-back lock blocks all logical processors (e.g., that are coupled to the memory via the bus that is locked) from accessing memory until the RMW operation is completed. Having a burst of bus locks by one of the logical processors thus causes data starvation to the rest of the logical processors in these embodiments. In a processor running real-time software (e.g., a real-time operating system (RTOS)) and general-purpose software (e.g., general purpose operating system (GPOS)), memory requests from the general-purpose software that cause issuance of non-write-back locks prevents the real-time software from accessing memory, and thus prevents real-time software from progressing in these embodiments. In one embodiment, this happens in a system including both RTOS and GPOS, where a GPOS configures a page table to allow non-write-back (non-WB) access to software. The embodiments herein thus are an improvement to the functioning of the processor (e.g., of a computer) itself by allowing for the selective control of the implementation or disabling of non-write-back locks as disclosed. With this feature, an internet of things (IoT) system can be free of these bus locks and will allow real-time software to run without interference from other software on the processor (e.g., CPU).

Certain embodiments herein provide a new architecture that allow software (e.g., an operating system) to selectively disable non-write-back lock accesses (e.g., disables servicing the memory request that was to cause the non-write-back lock), e.g., in contrast to just disabling all types of locks. In one embodiment, a new model-specific-register (MSR) bit is added, that when set to an "on" value, is to cause the processor (e.g., CPU) to disable non-write-back lock accesses, for example, by causing the generation of a general protection (GP) fault when software issues a non-WB lock access while this MSR bit is set to the "on" value.

FIG. 1 illustrates a hardware processor 100 coupled to a memory 102 according to embodiments of the disclosure. Memory 102 may be system memory, e.g., separate from a cache. Hardware processor 100 may include one or more cores (e.g., cores 104-1 to 104-N, where N is any integer greater than one). Each core may include one or more logical processors. A single logical processor may be a single core. A plurality of logical processors may be implemented on a single core, for example, where the core's components support multithreading (e.g., executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyper-Threading technology). A logical processor may share access to certain components, e.g., cache(s) or memory.

Hardware processor 100, as depicted in FIG. 1, includes two cores, core 104-1 and core 104-N, which share access to a higher level cache 128. Each core may execute a plurality of hardware threads. For example, in an embodiment with two logical processors being implemented by each core, software entities, such as an operating system, may view processor 100 as four separate logical processors, while processor 100 is capable of executing four software threads. Cores 104-A to 104-N may be symmetric cores as shown or be asymmetric cores, e.g., cores with different configurations, execution units, etc.

Figure 4:
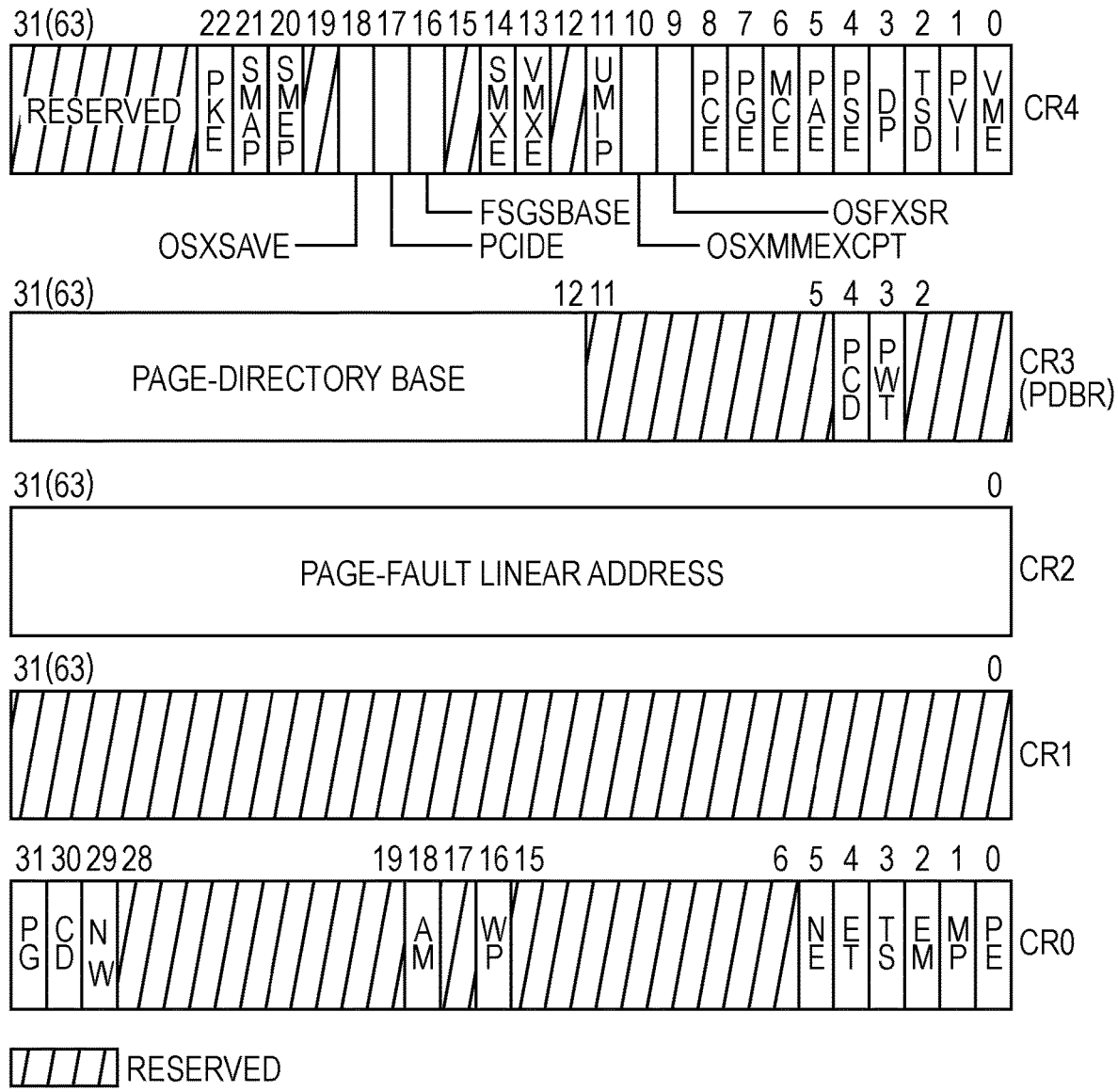
FIG. 4 illustrates an example format for control registers (e.g., CR4 to CR0) according to embodiments of the disclosure.

In certain embodiments, core 104-1 includes any combination of data register or registers 106-1, control register or registers 110-1, and capability register or registers 108-1. In one embodiment, data register 106-1 is used to store data that is to be operated on. In one embodiment, capability register 108-1 stores a bit or bits that each represent the capabilities of that particular core, for example, to indicate if the core (or all cores) supports non-write-back lock disablement as discussed herein e.g., as depicted in FIG. 3. In one embodiment, control register 110-1 stores a bit or bits that each control whether certain functionality is enabled for that core, for example, to turn on or off the non-write-back lock disablement as discussed herein. In one embodiment, control register 110-1 includes a memory control register 112-1, e.g., as depicted in FIG. 2. In one embodiment, control register 110-1 includes other control register or registers 114-1, e.g., as depicted in FIG. 4.

Depicted core 104-1 includes a branch target buffer (BTB), instruction cache (i-cache), and/or instruction translation lookaside buffer (I-TLB) 116-1, e.g., with a BTB to predict branches to be executed/taken, an instruction cache to cache instructions (e.g., instruction from a higher level cache and/or memory 102) and/or an I-TLB to store (e.g., linear to physical) address translation entries for instructions. In certain embodiments, a processor 100 capable of speculative execution prefetches and speculatively executes predicted branches.

Decoder 118-1 (e.g., decode circuit) is to decode an instruction (e.g., received from fetching of the instruction) into a decoded instruction. In one embodiment, processor 100 supports an Instruction Set Architecture (ISA) which defines and specifies instructions that are decodable/executable on processor 100.

Depicted core 104-1 includes a rename/allocator/scheduler 120-1. In one embodiment, rename circuitry is a register renamer to rename program/instruction reference registers to other registers internal to processor 100. In one embodiment, allocator circuitry is to allocate (e.g., reserve) processor resources, such as execution units and/or reorder buffers to track instruction results. In one embodiment, scheduler circuitry is to schedule execution of the instruction (e.g., microcode corresponding to the instruction) on the processor resources (e.g., execution unit(s) 122-1).

In certain embodiments, instructions (e.g., microcode) are scheduled on execution units (e.g., execution circuits) according to their type and/or availability. For example, a floating point instruction is scheduled on a port of an execution unit that has an available floating point execution unit. Register files associated with the execution units may also be included to store information instruction processing results. Exemplary execution units include a floating-point execution unit, an integer execution unit, a jump execution unit, a load execution unit, a store execution unit, or other execution units.

Depicted core 104-1 includes a reorder/retirement unit 124-1. In one embodiment, reorder/retirement unit 124-1 includes components, such as the reorder buffers mentioned above, load buffers, and store buffers, to support out-of-order execution and later in-order retirement of instructions executed out-of-order, e.g., where allocator and rename circuitry also reserve other resources, such as reorder buffers to track instruction results.

In certain embodiments, core 104-N includes any combination of data register or registers 106-N, control register or registers 110-N, and capability register or registers 108-N. In one embodiment, data register 106-N is used to store data that is to be operated on. In one embodiment, capability register 108-N stores a bit or bits that each represent the capabilities of that particular core, for example, to indicate if the core (or all cores) supports non-write-back lock disablement as discussed herein e.g., as depicted in FIG. 3. In one embodiment, control register 110-N stores a bit or bits that each control whether certain functionality is enabled for that core, for example, to turn on or off the non-write-back lock disablement as discussed herein. In one embodiment, control register 110-N includes a memory control register 112-N, e.g., as depicted in FIG. 2. In one embodiment, control register 110-N includes other control register or registers 114-N, e.g., as depicted in FIG. 4.

Depicted core 104-N includes a branch target buffer (BTB), instruction cache (i-cache), and/or instruction translation lookaside buffer (I-TLB) 116-N, e.g., with a BTB to predict branches to be executed/taken, an instruction cache (i-cache) to cache instructions (e.g., instruction from a higher level cache and/or memory 102), and/or an I-TLB to store (e.g., linear to physical) address translation entries for instructions. In certain embodiments, a processor 100 capable of speculative execution prefetches and speculatively executes predicted branches.

Decoder 118-N (e.g., decode circuit) is to decode an instruction (e.g., received from fetching of the instruction) into a decoded instruction. In one embodiment, processor 100 supports an Instruction Set Architecture (ISA) which defines and specifies instructions that are decodable/executable on processor 100.

Depicted core 104-N includes a rename/allocator/scheduler 120-N. In one embodiment, rename circuitry is a register renamer to rename program/instruction reference registers to other registers internal to processor 100. In one embodiment, allocator circuitry is to allocate (e.g., reserve) processor resources, such as execution units and/or reorder buffers to track instruction results. In one embodiment, scheduler circuitry is to schedule execution of the instruction (e.g., microcode corresponding to the instruction) on the processor resources (e.g., execution unit(s) 122-N).

In certain embodiments, instructions (e.g., microcode) are scheduled on execution units (e.g., execution circuits) according to their type and/or availability. For example, a floating-point instruction is scheduled on a port of an execution unit that has an available floating-point execution unit. Register files associated with the execution units may also be included to store information instruction processing results. Exemplary execution units include a floating-point execution unit, an integer execution unit, a jump execution unit, a load execution unit, a store execution unit, or other execution units.

Depicted core 104-N includes a reorder/retirement unit 124-N. In one embodiment, reorder/retirement unit 124-N includes components, such as the reorder buffers mentioned above, load buffers, and store buffers, to support out-of-order execution and later in-order retirement of instructions executed out-of-order, e.g., where allocator and rename circuitry also reserve other resources, such as reorder buffers to track instruction results.

Depicted core 104-1 includes a lower level data cache (d-cache) and/or data translation lookaside buffer (d-TLB), for example, with data cache to cache data (e.g., data from a higher level cache and/or memory 102) and/or D-TLB to store (e.g., linear to physical) address translation entries for stored data, e.g., coupled to a respective execution unit or units. Depicted processor 100 includes a higher level (e.g., L2 or L3) cache 128. A cache is included in certain embodiments to cache recently fetched and/or operated on elements. Note that higher-level may refer to cache levels being further way from the execution unit(s). In one embodiment, higher-level cache 128 is a second-level (L2) data cache. In one embodiment, each data cache is to store recently used/operated on elements, such as data operands, which are potentially held in cache coherency states, such as, but not limited to, modified, exclusive, shared, and invalid (MESI) states. A D-TLB may store recent virtual (or linear) to physical address translations. As a specific example, a processor may include a page table structure to break physical memory into a plurality of virtual pages. Data cache(s) may be utilized as a transactional memory or other memory to track tentative accesses during execution of a transaction. In one embodiment, page tables 136 and/or segment descriptor tables are stored in memory 102, e.g., and cached in one or more caches.

Processor 100 may include a memory controller 130 (or a system on a chip (SoC) having processor 100 may include a memory controller). In one embodiment, memory controller 130 controls the memory accesses, e.g., to service a miss of data in a cache by looking in a higher level cache(s) and/or memory 102. In one embodiment, higher level cache 128 (e.g., and memory controller 130) are coupled to a bus 132. In FIG. 1, bus 132 includes a port 134 to memory 102. Bus 132 may include other ports to communicate with devices external to processor 100, such as memory 102, a chipset, or other circuits. Memory 102 may be dedicated to processor 100 or shared with other devices in a system. Examples of memory 102 includes dynamic random access memory (DRAM), static RAM (SRAM), non-volatile memory (NV memory), etc. Bus 132 may include input/output (I/O) buffers to transmit and receive bus signals on the bus. Bus may be an interconnect.

In certain embodiments, a plurality of logical processors (e.g., of a single core 104-1 or 104-N, of on a plurality of cores 104-1 to 104-N) are performing operations. At least one of the logical processors may perform a locked read-modify-write (RMW) operation where the storage for the data to be read, then modified, the written back in its modified state, is locked from other logical processors modifying that storage during the RMW operation. As one example, a first logical processor (e.g., of core 104-1) that is to modify data (e.g., a cache line of data) is to assert a lock over the storage for that data, modifies the data (e.g., one or more bits thereof), then writes the modified version of the data back into the storage (e.g., the same location that was read from), and then de-asserts the lock, e.g., to prevent another logical processor (e.g., of core 104-1 or of core 104-N) from performing a write between the read and the write by the first logical processor. Non-limiting examples of read-modify-write types of memory requests that implement a lock (e.g., a bus lock) are certain lock instructions and flows (e.g., ADD with a lock prefix, updating segment access bits, or page tables access/dirty bits).

In certain embodiments, a locked RMW operation is for data that is stored in a cache (e.g., an L1 cache of core 104-1) shared by a plurality of logical processors (e.g., an L1 cache of core 104-1), so it only impacts software running on same logical processors that share this cache. However, in other embodiments, a non-write-back lock is implemented for an RMW type of memory request to the storage storing the data to be read and modified. In one embodiment, a non-write-back lock is implemented because the data to be read and modified is not stored within a (e.g., internal) cache of the logical processor to perform the RMW operation, but is stored in memory 102 separate from the cache that is locked from other accesses by the non-write-back lock. For example, locking a bus 132 that couples a plurality of logical processors to a memory.

In one embodiment, a locked RMW operation is for data that is stored in a cache of core 104-1 or core 104-N (e.g., higher level cache 128) shared by a plurality of logical processors of core 104-1 or core 104-N, and the cache that is locked from other accesses by a non-write-back lock of bus 132. Thus, in this embodiment, the non-write-back lock blocks all logical processors of core 104-1 or core 104-N from accessing memory until the RMW operation is completed. For example, where a first logical processor is running real-time code and a second logical processor is running general-purpose code, memory requests from the general-purpose software that cause issuance of non-write-back locks prevent the real-rime software from accessing memory, and thus prevents real-time software from progressing in certain embodiments.

Certain embodiments herein provide a new architecture that allow software (e.g., an operating system) to selectively disable non-write-back lock accesses (e.g., disables servicing the memory request that was to cause the non-write-back lock), e.g., in contrast to just disabling all types of locks. In one embodiment, a new bit is added in control register 110-1 and/or control register 110-N (e.g., memory control register 112-1 and/or memory control register 112-N), that when set to an "on" value instead of an "off" value, is to cause the processor (e.g., CPU) to disable non-write-back lock accesses, for example, by causing the generation of a general protection (GP) fault when software issues a non-WB lock access while this MSR bit is set to the "on" value. In one embodiment, each core includes its own bit in its control register (e.g., memory control register), that when set to an "on" value instead of an "off" value, is to cause the core to disable non-write-back lock accesses for that core (e.g., each logical processor implemented on that core). In one embodiment, each core of multiple cores shares a bit (or single field of multiple bits) in a shared control register (e.g., memory control register), that when set to an "on" value instead of an "off" value, is to cause the cores to disable non-write-back lock accesses for those cores (e.g., each logical processor implemented on those cores).

In certain embodiments, a memory request is sent by a requesting entity, e.g., an execution unit sends a load request or a store request. The memory request may a be a read-modify-write type, e.g., that reads a value from storage into an execution unit, modifies the value with the execution unit, and then writes that modified value back into the storage (e.g., the same storage location). In one embodiment, a memory request is received by memory controller 130 (e.g., to access memory 102), and the memory controller is to check if the control register (e.g., memory control register) has the bit in that control register (e.g., memory control register for a core that generated the memory request) that is set to an "on" value instead of an "off" value, is and thus cause the memory controller 130 to disable non-write-back (e.g., noncached) lock accesses for the memory 102 (e.g., by not allowing a bus lock of bus 132 for that memory request). In one embodiment, a non-write-back memory access is a memory access that is not serviceable from cache (e.g., non-cachable), but is serviced from memory 102.

In certain embodiments, memory requests for page tables 136 and/or segment descriptor tables 138 are read-modify-write types of memory requests, and thus may cause a locking access (e.g., a non-write-back lock access) of bus 132. In certain embodiments, page tables 136 store a data structure used by the virtual memory system in a computer (e.g., operating system) to indicate the mapping between virtual addresses and physical addresses to break physical memory into a plurality of virtual pages. In one embodiment, the physical address of the current page directory is stored in register CR3 (e.g., in FIG. 4), also may be referred to as the page directory base register (PDBR). In certain embodiments, segment descriptor tables 138 store a data structure used by the virtual memory system in a computer (e.g., operating system) to map a virtual (e.g., logical) address into a physical (e.g., linear) address.

Registers may include one or more of (e.g., any combination of): control registers (e.g., CR0 through CR4) determine the operating mode of the processor and the characteristics of the currently executing task; memory control registers may include one or more of memory management registers (e.g., global descriptor table register (GDTR), interrupt descriptor table register (IDTR), task register, or local descriptor table register (LDTR) to specify the locations of data structures used in protected mode memory management; debug registers (e.g., DR0 through DR7) to control and allow monitoring of the processor's debugging operations; memory type range registers (MTRRs) used to assign memory types to regions of memory; or machine (e.g., model) specific registers (MSRs) used to control and report on processor (e.g., per core) performance (e.g., where MSRs, other than the time-stamp counter, are to handle system related functions and are not accessible to an application program). FIGS. 2-4 illustrate various register formats that may be utilized.

In one embodiment, processor 100 is to disable a non-write-back lock access of the bus by generating a fault (e.g., interrupt) (for example, a general protection fault that stops execution of the request for the lock of the bus and sends an interrupt, e.g., to be read by the operating system), for example, per logical processor or per core.

In certain embodiments, there are some cases where it may be desirable for a processor (e.g., a CPU) to not create a general protection fault even when a non-write-back lock (e.g., lock access) of the bus (e.g., a locked RMW access) is detected and the non-write-back lock disable bit is set (e.g., MEMORY_CONTROL[Non_WB_LOCK_DISABLE] bit is set):

1. When hardware and/or software has disabled cache (e.g., by setting bit CD in register CR0 to "on") so all access are un-cacheable,
2. When memory of a protected container (e.g., enclave) is used by memory encryption circuit 140 with non-write-back memory type, e.g., preserved memory used for Intel® Software Guard Extensions (SGX) is programmed with non-write-back memory type,
3. Virtual Machine Monitor (VMM) enabled extended page tables (EPT) and EPT Access/Dirty (A/D) and EPT memory type (MEMTYPE) is non-write-back (non-WB), or
4. Posted interrupt descriptor if it is mapped to non-write-back memory.

In certain embodiments hardware and/or software can ensure that bus locks (as a result of a non-write-back locked access) are never taken by:

1. Setting non-write-back lock disable bit (e.g., in TEST_CTRL [NON-WRITE-BACK LOCK DISABLE]) to "on",
2. Not disabling caches (e.g., not setting CR0.CD to "on"),
3. Configuring processor reserved memory range register (PRMRR) to be "write-back" always (e.g., by setting control register that that provide operating system software with control of how accesses to memory ranges by the processor are cached),
4. If using EPT and enabling EPT A/D bits, then locating EPT paging structures in write-back memory, or
5. If using posted interrupts then locating the posted interrupt descriptor in write back memory instead of non-write-back memory.

Table 1 below illustrates example cases where bus locks can come from non-write-back lock access for a bus (e.g., for a read-modify-write type of memory request). Note that the below includes example instructions, and the possible format of instructions if discussed further below.

TABLE 1

EXAMPLE FLOWS/INSTRUCTIONS THAT CAN CAUSE A BUS LOCK

| CATEGORY | INSTRUCTIONS | CONDITIONS |
| --- | --- | --- |
| ARITHMETIC | LOCK PREFIX + {ADD, SUBTRACT, AND, OR, XOR, ADD WITH CARRY (ADC), SUBTRACT WITH BORROW (SBB), INCREMENT, DECREMENT, NOT, NEGATION (TWO'S COMPLEMENT NEGATION)} | IF MAPPED TO NON-WRITE-BACK MEMORY |
| COMPARE/TEST | LOCK + {BIT TEST AND COMPLEMENT (BTC), BIT TEST AND RESET (BTR), BIT TEST AND SET (BTS)} | IF MAPPED TO NON-WRITE-BACK MEMORY |
| EXCHANGE | EXCHANGE (XCHG), LOCK PREFIX + {EXCHANGE AND ADD (XADD)/COMPARE AND EXCHANGE (CMPXCHG)/ EXCHANGE (XCHG)} | IF MAPPED TO NON-WRITE-BACK MEMORY |
| SEGMENTATION | LOAD SEGMENT LIMIT (LSL), LOAD ACCESS RIGHTS BYTE (LAR), VERIFY A SEGMENT FOR READING (VERR), VERIFY A SEGMENT FOR WRITING (VERW), LOAD POINTER USING DATA SEGMENT (DS) REGISTER (LDS), LOAD POINTER USING EXTRA SEGMENT (ES) REGISTER (LES), LOAD POINTER USING FS REGISTER (LFS), LOAD POINTER USING GS REGISTER (LGS), LOAD POINTER USING STACK SEGMENT (SS) REGISTER (LSS), MOVE DATA INTO DS REGISTER (MOV DS), MOVE DATA INTO ES REGISTER (MOV ES), MOVE DATA INTO FS REGISTER (MOV FS), MOVE DATA INTO GS REGISTER (MOV GS), MOVE DATA INTO SS REGISTER (MOV SS), POP A VALUE FROM STACK INTO DS REGISTER (POP DS), POP A VALUE FROM STACK INTO ES REGISTER (POP ES), POP A VALUE FROM STACK INTO FS REGISTER (POP FS), POP A VALUE FROM STACK INTO GS REGISTER (POP GS), AND POP A VALUE FROM STACK INTO SS REGISTER (POP SS) | SETTING SEGMENT ACCESSED BIT IN DESCRIPTOR IN NON-WRITE-BACK MEMORY |

TABLE 1-continued

EXAMPLE FLOWS/INSTRUCTIONS THAT CAN CAUSE A BUS LOCK

| CATEGORY | INSTRUCTIONS | CONDITIONS |
|---|---|---|
| CALL/INTERRUPT/ EXCEPTION | FAR CALL, FAR JUMP (JMP), FAR RETURN (RET), INTERRUPT RETURN (IRET), CALL INTERRUPT HANDLER "N" WHERE N SPECIFIES THE INTERRUPT VECTOR (INT N), INTERRUPT TO GENERATE A BREAKPOINT TRAP (INT3), INTERRUPT TO GENERATE OVERFLOW TRAP IF OVERFLOW FLAG IS ONE (INTO), INTERRUPT TO GENERATE A DEBUG TRAP (INT1), CALL THROUGH INTERRUPT/TRAP GATE | SETTING SEGMENT ACCESSED BIT IN DESCRIPTOR IN NON-WRITE-BACK MEMORY |
| TASKING | LOAD TASK REGISTER (LTR), TASK SWITCH | SETTING/CLEARING TASK STATE SEGMENT (TSS) BUSY WHEN TSS IN MON-WRITE-BACK MEMORY SETTING SEGMENT ACCESSED BIT IN DESCRIPTOR IN NON-WRITE-BACK MEMORY |
| PAGING | CODE FETCH (E.G., A BIT UPDATE), E.G., INSTRUCTIONS THAT HAVE MEMORY OPERANDS (ACCESS/DIRTY UPDATE ON DATA LOAD/STORE/LWSI) | PAGE TABLES IN NON-WRITE-BACK MEMORY |
| ENCLAVE | ENTER AN ENCLAVE (ENCLU), ACTIVATE BLOCK CHECKING FOR ENCLAVE (ENCLS), ASYNCHRONOUS ENCLAVE EXIT (AEX) CAUSED BY EVENTS WHILE EXECUTING ENCLAVE CODE | IF PRESERVED MEMORY IS MAPPED IN NON-WRITE-BACK MEMORY |
| POSTED INTERRUPTS | UPDATING THE POSTED INTERRUPT DESCRIPTOR USES LOCKED READ-MODIFY-WRITE FOR ATOMIC OPERATIONS | POSTED INTERRUPT DESCRIPTOR IN NON-WRITE-BACK MEMORY |

In certain embodiments, a control bit is added to control enabling and disabling of non-write-back locks (e.g., by executing a write MSR (WRMSR) instruction, e.g., after a read MSR (RDMSR) instruction to read the contents of that MSR) (e.g., TEST_CTRL MSR (address 033H) bit #28 in FIG. 2).

In certain embodiments, a capability bit is added to enumerate that existence of non-write-back lock disablement feature, (e.g., in IA32_CORE_CAPABILITIES MSR (address 0CFH) bit #4 in FIG. 3).

FIG. 2 illustrates an example format 200 for a memory control register (e.g., TEST_CTRL) according to embodiments of the disclosure. Depicted format 200 includes a register address 202 of hexadecimal 33H (decimal 51). Format 200 includes bit 28 to control the enabling (e.g., when set to zero) and disabling (e.g., when set to one) of non-write-back locks. Depicted format 200 further includes reserved (e.g., unused) bits 0 to 27, bit 29 to enable alignment check (#AC (0)) for split locked access, e.g., to cause an alignment check exception for split locked access at all current privilege levels (CPLs) irrespective of CR0.AM of EFLAGS.AC (e.g., if bits 29 and 31 are set, bit 29 takes precedence), bit 30 being reserved, and bit 31 to disable bus lock (e.g., LOCK #signal) assertion for split locked access. In one embodiment, a split lock is an atomic operation that is to access two cache lines that causes a bus lock while the two cache lines are accessed. The non-write-back lock of a bus discussed herein may be utilized for access to a single cache line of data or less (e.g., not a split lock).

It should be understood that the numbers are examples, and other formats may be used (e.g., 64 bit registers instead of 32 bit registers).

FIG. 3 illustrates an example format 300 for a capabilities register according to embodiments of the disclosure according to embodiments of the disclosure. Depicted format 300 includes a register address 302 of hexadecimal CFH (decimal 207). Format 300 includes bit 4 to indicate when the corresponding component (e.g., core) includes non-write-back lock disablement capability (e.g., when set to one) or does not include non-write-back lock disablement capability disabling (e.g., when set to zero) of non-write-back locks. The capabilities bit may be programmed during manufacture, e.g., and not changeable by a user.

Depicted format 300 further includes reserved (e.g., unused) bits 0 to 3, bit 5 to indicate (e.g., when set to one) that the component (e.g., core) supports (e.g., #AC (0)) alignment check exceptions for split locked accesses, and bits 6 to 31 being reserved.

It should be understood that the numbers are examples, and other formats may be used (e.g., 64 bit registers instead of 32 bit registers).

FIG. 4 illustrates an example format for control registers (e.g., CR4 to CR0) according to embodiments of the disclosure.

Format for register CR4 may include one or more of the following fields in Table 2.

TABLE 2

CR4 example format

| Bit | Name | Full Name | Description |
|---|---|---|---|
| 0 | VME | Virtual 8086 Mode Extensions | If set, enables support for the virtual interrupt flag (VIF) in virtual-8086 mode. |
| 1 | PVI | Protected-mode Virtual Interrupts | If set, enables support for the virtual interrupt flag (VIF) in protected mode. |
| 2 | TSD | Time Stamp Disable | If set, RDTSC instruction can only be executed when in ring 0, otherwise RDTSC can be used at any privilege level. |
| 3 | DE | Debugging Extensions | If set, enables debug register based breaks on I/O space access. |
| 4 | PSE | Page Size Extension | If unset, page size is 4 KiB, else page size is increased to 4 MiB If PAE is enabled or the processor is in x86-64 long mode this bit is ignored. |
| 5 | PAE | Physical Address Extension | If set, changes page table layout to translate 32-bit virtual addresses into extended 36-bit physical addresses. |
| 6 | MCE | Machine Check Exception | If set, enables machine check interrupts to occur. |
| 7 | PGE | Page Global Enabled | If set, address translations (PDE or PTE records) may be shared between address spaces. |
| 8 | PCE | Performance-Monitoring Counter enable | If set, RDPMC can be executed at any privilege level, else RDPMC can only be used in ring 0. |
| 9 | OSFXSR | Operating system support for FXSAVE and FXRSTOR instructions | If set, enables Streaming SIMD Extensions (SSE) instructions and fast FPU save & restore. |
| 10 | OSXMMEXCPT | Operating System Support for Unmasked SIMD Floating-Point Exceptions | If set, enables unmasked SSE exceptions. |
| 11 | UMEP | User-Mode Instruction Prevention | If set, the SGDT, SIDT, SLDT, SMSW and STR instructions cannot be executed if CPL > 0. |
| 12 | Reserved | | |
| 13 | VMXE | Virtual Machine Extensions Enable | Enables VT-x x86 virtualization. |
| 14 | SMXE | Safer Mode Extensions Enable | Enables Trusted Execution Technology (TXT) |
| 16 | FSGSBASE | Enables the instructions RDFSBASE, RDGSBASE, WRFSBASE, and WRGSBASE. | |
| 17 | PCIDE | PCID Enable | If set, enables process-context identifiers (PCIDs). |
| 18 | OSXSAVE | XSAVE and Processor Extended States Enable | |
| 20 | SMEP | Supervisor Mode Execution Protection Enable | If set, execution of code in a higher ring generates a fault. |
| 21 | SMAP | Supervisor Mode Access Prevention Enable | If set, access of data in a higher ring generates a fault. |
| 22 | PKE | Protection Key Enable | Enables protection key |

Format for register CR3 may include one or more of the following: when virtual addressing is enabled (e.g., the PG bit is set in CR0), CR3 enables the processor to translate linear addresses into physical addresses by locating the page directory and page tables for the current task. As one example, the upper 20 bits of CR3 are the page directory base register (PDBR) which stores the physical address of the first page directory entry. If the PCIDE bit in CR4 is set, the lowest 12 bits are used for the process-context identifier (PCID). Bit 4 may store page-level cache disable (PCD) to control the memory type used to access the first paging structure of the current paging-structure hierarchy (e.g., and this bit 4 not being used if paging is disabled, with physical address extension (PAE) paging, or with four-level paging when CR4.PCIDE=1). Bit 3 may store page-level write-through (PWT) to control the memory type used to access the first paging structure of the current paging-structure hierarchy (e.g., and this bit 4 not being used if paging is disabled, with physical address extension (PAE) paging, or with four-level paging when CR4.PCIDE=1).

Format for register CR2 may be storage for a Page-Fault Linear Address (PFLA), e.g., when a page fault occurs, the address the program attempted to access is stored in the CR2 register.

Format for register CR1 may be reserved, e.g., the processor (e.g., CPU) will throw an (e.g., #UD) exception when trying to access it.

Format for register CR0 may include one or more of the following fields in Table 3.

TABLE 3

CR0 example format

| Bit | Name | Full Name | Description |
|---|---|---|---|
| 0 | PE | Protected Mode Enable | If one, system is in protected mode, else system is in real mode |
| 1 | MP | Monitor co-processor | Controls interaction of WAIT/FWAIT instructions with TS flag in CR0 |
| 2 | EM | Emulation | If set, no x87 floating-point unit present, if clear, x87 FPU present |
| 3 | TS | Task switched | Allows saving x87 task context upon a task switch only after x87 instruction used |
| 4 | ET | Extension type | On the 386, it allowed to specify whether the external math coprocessor was an 80287 or 80387 |
| 5 | NE | Numeric error | Enable internal x87 floating point error reporting when set, else enables PC style x87 error detection |
| 16 | WP | Write protect | When set, the CPU can't write to read-only pages when privilege level is 0 |
| 18 | AM | Alignment mask | Alignment check enabled if AM set, AC flag (in EFLAGS register) set, and privilege level is 3 |
| 29 | NW | Not-write through | Globally enables/disable write-through caching |
| 30 | CD | Cache disable | Globally enables/disable the memory cache |
| 31 | PG | Paging | If one, enable paging and use the CR3 register, else disable paging. |

Figure 5:
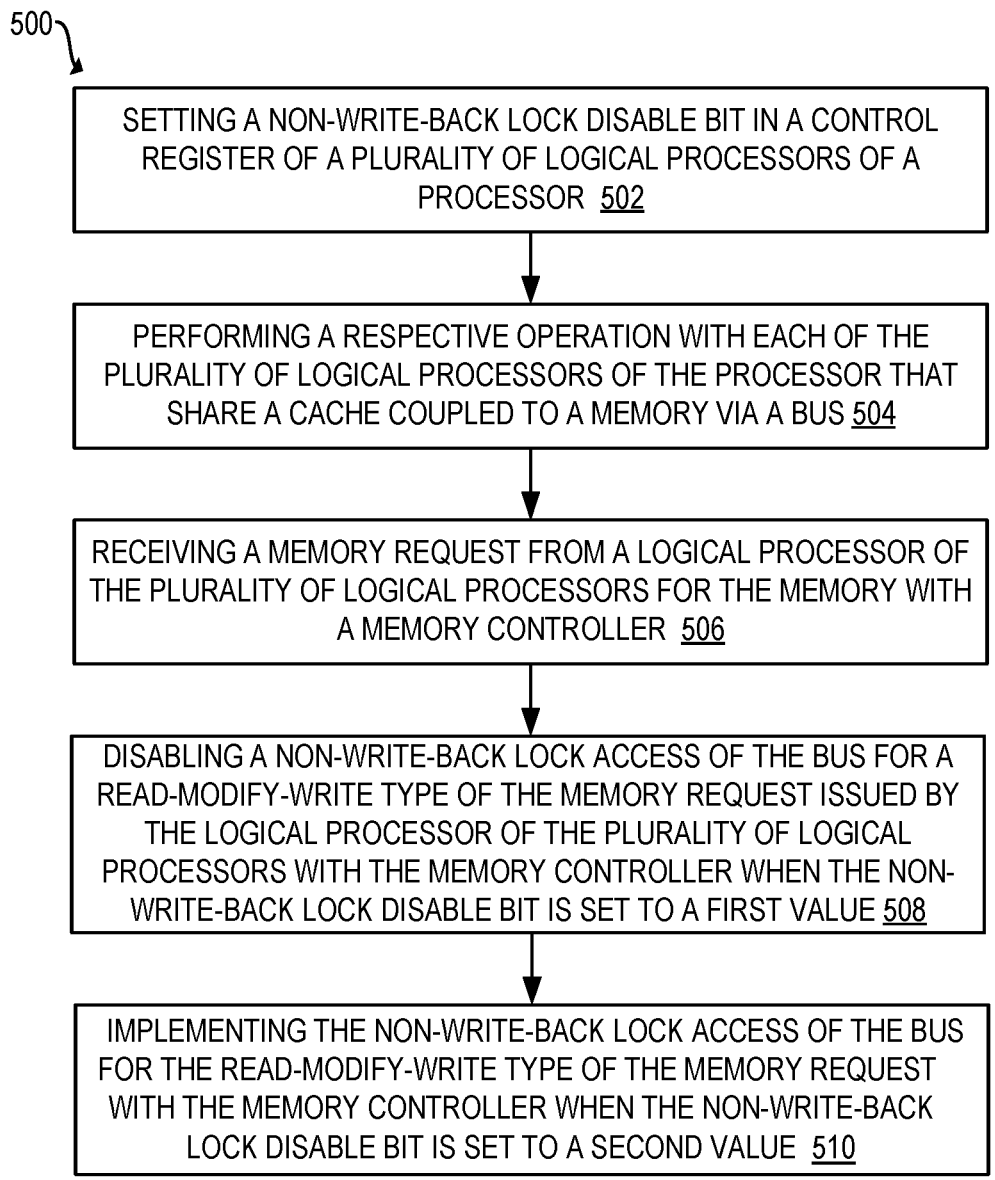
FIG. 5 is a flow diagram according to embodiments of the disclosure.

FIG. 5 is a flow diagram according to embodiments of the disclosure. Depicted flow 500 includes setting a non-write-back lock disable bit in a control register of a plurality of logical processors of a processor 502; performing a respective operation with each of the plurality of logical processors of the processor that share a cache coupled to a memory via a bus 504; receiving a memory request from a logical processor of the plurality of logical processors for the memory with a memory controller 506; disabling a non-write-back lock access of the bus for a read-modify-write type of the memory request issued by the logical processor of the plurality of logical processors with the memory controller when the non-write-back lock disable bit is set to a first value 508; and implementing the non-write-back lock access of the bus for the read-modify-write type of the memory request with the memory controller when the non-write-back lock disable bit is set to a second value 510.

Exemplary architectures, systems, etc. that the above may be used in are detailed below.

At least some embodiments of the disclosed technologies can be described in view of the following examples:
Example 1. An apparatus comprising:
a plurality of logical processors;
a control register comprising a non-write-back lock disable bit;
a cache shared by the plurality of logical processors;
a bus to couple the cache to a memory to service a memory request for the memory from the plurality of logical processors; and
a memory controller to disable a non-write-back lock access of the bus for a read-modify-write type of the memory request issued by a logical processor of the plurality of logical processors when the non-write-back lock disable bit is set to a first value, and implement the non-write-back lock access of the bus for the read-modify-write type of the memory request when the non-write-back lock disable bit is set to a second value.

2. The apparatus of example 1, wherein the memory controller is to create a general protection fault to disable the non-write-back lock access.

3. The apparatus of example 1, wherein the control register is a memory control register.

4. The apparatus of example 3, wherein an address of the memory control register is thirty-three hexadecimal.

5. The apparatus of example 1, further comprising a capabilities register comprising a capability bit that, when set to a first value, indicates the plurality of logical processors supports a non-write-back lock access disable feature, and, when set to a second value, indicates the plurality of logical processors does not support the non-write-back lock access disable feature.

6. The apparatus of example 1, wherein the memory controller is to, when a cache disable bit is set to a value in a second control register to disable the cache, not disable the non-write-back lock access of the bus for the read-modify-write type of the memory request issued by the logical processor of the plurality of logical processors when the non-write-back lock disable bit is set to the first value.

7. The apparatus of example 1, wherein the memory controller is to, when extended page tables are enabled and memory type is set to non-write-back, not disable the non-write-back lock access of the bus for the read-modify-write type of the memory request issued by the logical processor of the plurality of logical processors when the non-write-back lock disable bit is set to the first value.

8. The apparatus of example 1, wherein the plurality of logical processors is a plurality of processor cores.
Example 9. A method comprising:
setting a non-write-back lock disable bit in a control register of a plurality of logical processors of a processor;
performing a respective operation with each of the plurality of logical processors of the processor that share a cache coupled to a memory via a bus;
receiving a memory request from a logical processor of the plurality of logical processors for the memory with a memory controller;
disabling a non-write-back lock access of the bus for a read-modify-write type of the memory request issued by the logical processor of the plurality of logical processors with the memory controller when the non-write-back lock disable bit is set to a first value; and implementing the non-write-back lock access of the bus for the read-modify-write type of the memory request with the memory controller when the non-write-back lock disable bit is set to a second value.

10. The method of example 9, wherein the disabling the non-write-back lock access comprises generating a general protection fault.

11. The method of example 9, wherein the control register is a memory control register.

12. The method of example 11, wherein an address of the memory control register is thirty-three hexadecimal.

13. The method of example 9, further comprising setting a capability bit of a capabilities register of the processor to a first value to indicate the plurality of logical processors supports a non-write-back lock access disable feature, and setting the capability bit to a second value to indicate the plurality of logical processors does not support the non-write-back lock access disable feature.

14. The method of example 9, further comprising setting a cache disable bit in a second control register to a value to disable the cache, wherein the memory controller then does not disable the non-write-back lock access of the bus for the read-modify-write type of the memory request issued by the logical processor of the plurality of logical processors when the non-write-back lock disable bit is set to the first value.

15. The method of example 9, further comprising enabling extended page tables for the plurality of logical processors and setting memory type to non-write-back, wherein the memory controller then does not disable the non-write-back lock access of the bus for the read-modify-write type of the memory request issued by the logical processor of the plurality of logical processors when the non-write-back lock disable bit is set to the first value.

16. The method of example 9, wherein the plurality of logical processors is a plurality of processor cores.

Example 17. A non-transitory machine readable medium that stores code that when executed by a machine causes the machine to perform a method comprising:

setting a non-write-back lock disable bit in a control register of a plurality of logical processors of a processor;

performing a respective operation with each of the plurality of logical processors of the processor that share a cache coupled to a memory via a bus;

receiving a memory request from a logical processor of the plurality of logical processors for the memory with a memory controller;

disabling a non-write-back lock access of the bus for a read-modify-write type of the memory request issued by the logical processor of the plurality of logical processors with the memory controller when the non-write-back lock disable bit is set to a first value; and implementing the non-write-back lock access of the bus for the read-modify-write type of the memory request with the memory controller when the non-write-back lock disable bit is set to a second value.

18. The non-transitory machine readable medium of example 17, wherein the disabling the non-write-back lock access comprises generating a general protection fault.

19. The non-transitory machine readable medium of example 17, wherein the control register is a memory control register.

20. The non-transitory machine readable medium of example 19, wherein an address of the memory control register is thirty-three hexadecimal.

21. The non-transitory machine readable medium of example 17, further comprising setting a capability bit of a capabilities register of the processor to a first value to indicate the plurality of logical processors supports a non-write-back lock access disable feature, and setting the capability bit to a second value to indicate the plurality of logical processors does not support the non-write-back lock access disable feature.

22. The non-transitory machine readable medium of example 17, further comprising setting a cache disable bit in a second control register to a value to disable the cache, wherein the memory controller then does not disable the non-write-back lock access of the bus for the read-modify-write type of the memory request issued by the logical processor of the plurality of logical processors when the non-write-back lock disable bit is set to the first value.

23. The non-transitory machine readable medium of example 17, further comprising enabling extended page tables for the plurality of logical processors and setting memory type to non-write-back, wherein the memory controller then does not disable the non-write-back lock access of the bus for the read-modify-write type of the memory request issued by the logical processor of the plurality of logical processors when the non-write-back lock disable bit is set to the first value.

24. The non-transitory machine readable medium of example 17, wherein the plurality of logical processors is a plurality of processor cores.

In yet another embodiment, an apparatus comprises a data storage device that stores code that when executed by a hardware processor causes the hardware processor to perform any method disclosed herein. An apparatus may be as described in the detailed description. A method may be as described in the detailed description.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source 1/destination and source 2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, November 2018; and see Intel® Architecture Instruction Set Extensions Programming Reference, October 2018).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 6A:
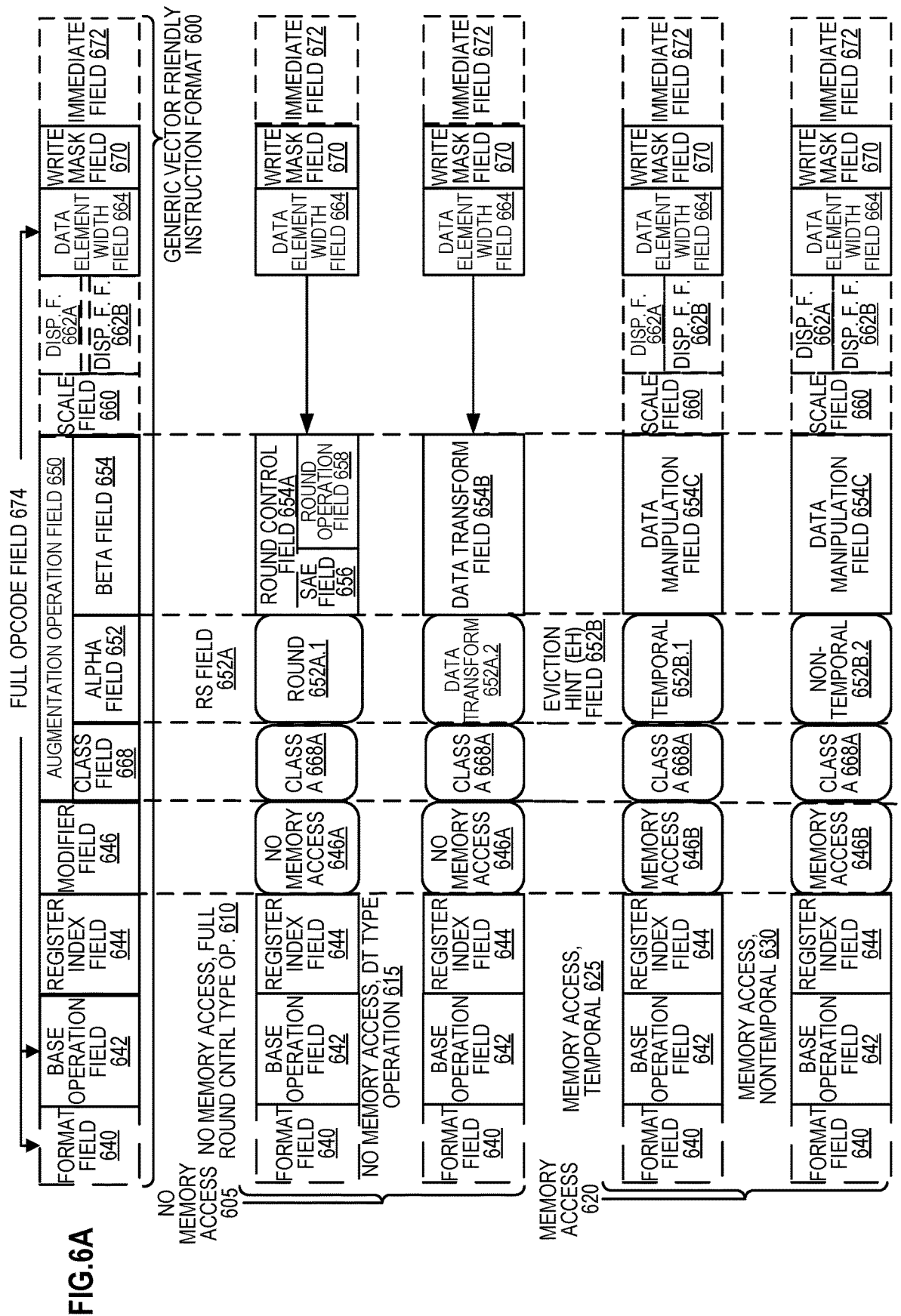
FIG. 6A is a block diagram illustrating a generic vector friendly instruction format and class A instruction templates thereof according to embodiments of the disclosure.
Figure 6B:
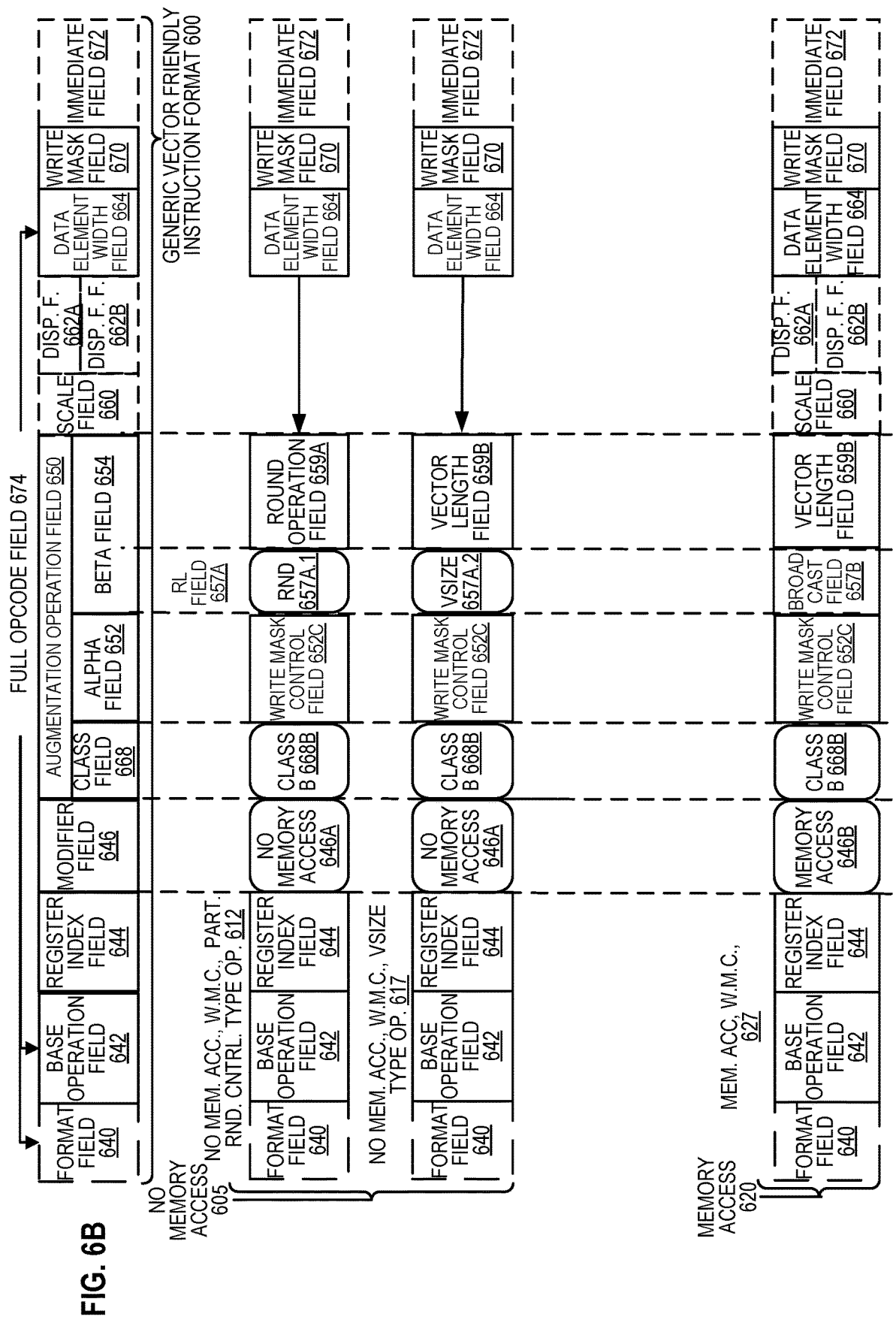
FIG. 6B is a block diagram illustrating the generic vector friendly instruction format and class B instruction templates thereof according to embodiments of the disclosure.

FIGS. 6A-6B are block diagrams illustrating a generic vector friendly instruction format and instruction templates thereof according to embodiments of the disclosure. FIG. 6A is a block diagram illustrating a generic vector friendly instruction format and class A instruction templates thereof according to embodiments of the disclosure; while FIG. 6B is a block diagram illustrating the generic vector friendly instruction format and class B instruction templates thereof according to embodiments of the disclosure. Specifically, a generic vector friendly instruction format 600 for which are defined class A and class B instruction templates, both of which include no memory access 605 instruction templates and memory access 620 instruction templates. The term generic in the context of the vector friendly instruction format refers to the instruction format not being tied to any specific instruction set.

While embodiments of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 6A include: 1) within the no memory access 605 instruction templates there is shown a no memory access, full round control type operation 610 instruction template and a no memory access, data transform type operation 615 instruction template; and 2) within the memory access 620 instruction templates there is shown a memory access, temporal 625 instruction template and a memory access, non-temporal 630 instruction template. The class B instruction templates in FIG. 6B include: 1) within the no memory access 605 instruction templates there is shown a no memory access, write mask control, partial round control type operation 612 instruction template and a no memory access, write mask control, vsize type operation 617 instruction template; and 2) within the memory access 620 instruction templates there is shown a memory access, write mask control 627 instruction template.

The generic vector friendly instruction format 600 includes the following fields listed below in the order illustrated in FIGS. 6A-6B.

Format field 640—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 642—its content distinguishes different base operations.

Register index field 644—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 646—its content distinguishes occurrences of instructions in the generic vector instruction format that specify memory access from those that do not; that is, between no memory access 605 instruction templates and memory access 620 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 650—its content distinguishes which one of a variety of different operations to be performed in addition to the base operation. This field is context specific. In one embodiment of the disclosure, this field is divided into a class field 668, an alpha field 652, and a beta field 654. The augmentation operation field 650 allows common groups of operations to be performed in a single instruction rather than 2, 3, or 4 instructions.

Scale field 660—its content allows for the scaling of the index field's content for memory address generation (e.g., for address generation that uses $2^{scale}*index+base$).

Displacement Field 662A—its content is used as part of memory address generation (e.g., for address generation that uses $2^{scale}*index+base+displacement$).

Displacement Factor Field 662B (note that the juxtaposition of displacement field 662A directly over displacement factor field 662B indicates one or the other is used)—its content is used as part of address generation; it specifies a displacement factor that is to be scaled by the size of a memory access (N)—where N is the number of bytes in the memory access (e.g., for address generation that uses $2^{scale}*index+base+scaled\ displacement$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 674 (described later herein) and the data manipulation field 654C. The displacement field 662A and the displacement factor field 662B are optional in the sense that they are not used for the no memory access 605 instruction templates and/or different embodiments may implement only one or none of the two.

Data element width field 664—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 670—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 670 allows for partial vector operations, including loads, stores, arithmetic, logical, etc. While embodiments of the disclosure are described in which the write mask field's 670 content selects one of a number of write mask registers that contains the write mask to be used (and thus the write mask field's 670 content indirectly identifies that masking to be performed), alternative embodiments instead or additional allow the mask write field's 670 content to directly specify the masking to be performed.

Immediate field 672—its content allows for the specification of an immediate. This field is optional in the sense that is it not present in an implementation of the generic vector friendly format that does not support immediate and it is not present in instructions that do not use an immediate.

Class field 668—its content distinguishes between different classes of instructions. With reference to FIGS. 6A-B, the contents of this field select between class A and class B instructions. In FIGS. 6A-B, rounded corner squares are used to indicate a specific value is present in a field (e.g., class A 668A and class B 668B for the class field 668 respectively in FIGS. 6A-B).

Instruction Templates of Class A

In the case of the non-memory access 605 instruction templates of class A, the alpha field 652 is interpreted as an RS field 652A, whose content distinguishes which one of the different augmentation operation types are to be performed (e.g., round 652A.1 and data transform 652A.2 are respectively specified for the no memory access, round type operation 610 and the no memory access, data transform type operation 615 instruction templates), while the beta field 654 distinguishes which of the operations of the specified type is to be performed. In the no memory access 605 instruction templates, the scale field 660, the displacement field 662A, and the displacement scale filed 662B are not present.

No-Memory Access Instruction Templates—Full Round Control Type Operation

In the no memory access full round control type operation 610 instruction template, the beta field 654 is interpreted as a round control field 654A, whose content(s) provide static rounding. While in the described embodiments of the disclosure the round control field 654A includes a suppress all floating point exceptions (SAE) field 656 and a round operation control field 658, alternative embodiments may support may encode both these concepts into the same field or only have one or the other of these concepts/fields (e.g., may have only the round operation control field 658).

SAE field 656—its content distinguishes whether or not to disable the exception event reporting; when the SAE field's 656 content indicates suppression is enabled, a given instruction does not report any kind of floating-point exception flag and does not raise any floating point exception handler.

Round operation control field 658—its content distinguishes which one of a group of rounding operations to perform (e.g., Round-up, Round-down, Round-towards-zero and Round-to-nearest). Thus, the round operation control field 658 allows for the changing of the rounding mode on a per instruction basis. In one embodiment of the disclosure where a processor includes a control register for specifying rounding modes, the round operation control field's 650 content overrides that register value.

No Memory Access Instruction Templates—Data Transform Type Operation

In the no memory access data transform type operation 615 instruction template, the beta field 654 is interpreted as a data transform field 654B, whose content distinguishes which one of a number of data transforms is to be performed (e.g., no data transform, swizzle, broadcast).

In the case of a memory access 620 instruction template of class A, the alpha field 652 is interpreted as an eviction hint field 652B, whose content distinguishes which one of the eviction hints is to be used (in FIG. 6A, temporal 652B.1 and non-temporal 652B.2 are respectively specified for the memory access, temporal 625 instruction template and the memory access, non-temporal 630 instruction template), while the beta field 654 is interpreted as a data manipulation field 654C, whose content distinguishes which one of a number of data manipulation operations (also known as primitives) is to be performed (e.g., no manipulation; broadcast; up conversion of a source; and down conversion of a destination). The memory access 620 instruction templates include the scale field 660, and optionally the displacement field 662A or the displacement scale field 662B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 652 is interpreted as a write mask control (Z) field 652C, whose content distinguishes whether the write masking controlled by the write mask field 670 should be a merging or a zeroing.

In the case of the non-memory access 605 instruction templates of class B, part of the beta field 654 is interpreted as an RL field 657A, whose content distinguishes which one of the different augmentation operation types are to be performed (e.g., round 657A.1 and vector length (VSIZE) 657A.2 are respectively specified for the no memory access, write mask control, partial round control type operation 612 instruction template and the no memory access, write mask control, VSIZE type operation 617 instruction template), while the rest of the beta field 654 distinguishes which of the operations of the specified type is to be performed. In the no memory access 605 instruction templates, the scale field 660, the displacement field 662A, and the displacement scale filed 662B are not present.

In the no memory access, write mask control, partial round control type operation 610 instruction template, the rest of the beta field 654 is interpreted as a round operation field 659A and exception event reporting is disabled (a given instruction does not report any kind of floating-point exception flag and does not raise any floating point exception handler).

Round operation control field 659A—just as round operation control field 658, its content distinguishes which one of a group of rounding operations to perform (e.g., Round-up, Round-down, Round-towards-zero and Round-to-nearest). Thus, the round operation control field 659A allows for the changing of the rounding mode on a per instruction basis. In one embodiment of the disclosure where a processor includes a control register for specifying rounding modes, the round operation control field's 650 content overrides that register value.

In the no memory access, write mask control, VSIZE type operation 617 instruction template, the rest of the beta field 654 is interpreted as a vector length field 659B, whose content distinguishes which one of a number of data vector lengths is to be performed on (e.g., 128, 256, or 512 byte).

In the case of a memory access 620 instruction template of class B, part of the beta field 654 is interpreted as a broadcast field 657B, whose content distinguishes whether or not the broadcast type data manipulation operation is to be performed, while the rest of the beta field 654 is interpreted the vector length field 659B. The memory access 620 instruction templates include the scale field 660, and optionally the displacement field 662A or the displacement scale field 662B.

With regard to the generic vector friendly instruction format 600, a full opcode field 674 is shown including the format field 640, the base operation field 642, and the data element width field 664. While one embodiment is shown where the full opcode field 674 includes all of these fields, the full opcode field 674 includes less than all of these fields in embodiments that do not support all of them. The full opcode field 674 provides the operation code (opcode).

The augmentation operation field 650, the data element width field 664, and the write mask field 670 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the disclosure, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 7 is a block diagram illustrating an exemplary specific vector friendly instruction format according to embodiments of the disclosure. FIG. 7 shows a specific vector friendly instruction format 700 that is specific in the sense that it specifies the location, size, interpretation, and order of the fields, as well as values for some of those fields. The specific vector friendly instruction format 700 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 6 into which the fields from FIG. 7 map are illustrated.

It should be understood that, although embodiments of the disclosure are described with reference to the specific vector friendly instruction format 700 in the context of the generic vector friendly instruction format 600 for illustrative purposes, the disclosure is not limited to the specific vector friendly instruction format 700 except where claimed. For example, the generic vector friendly instruction format 600 contemplates a variety of possible sizes for the various fields, while the specific vector friendly instruction format 700 is shown as having fields of specific sizes. By way of specific example, while the data element width field 664 is illustrated as a one bit field in the specific vector friendly instruction format 700, the disclosure is not so limited (that is, the generic vector friendly instruction format 600 contemplates other sizes of the data element width field 664).

The generic vector friendly instruction format 600 includes the following fields listed below in the order illustrated in FIG. 7A.

EVEX Prefix (Bytes 0-3) 702—is encoded in a four-byte form.

Format Field 640 (EVEX Byte 0, bits [7:0])—the first byte (EVEX Byte 0) is the format field 640 and it contains 0x62 (the unique value used for distinguishing the vector friendly instruction format in one embodiment of the disclosure).

The second-fourth bytes (EVEX Bytes 1-3) include a number of bit fields providing specific capability.

REX field 705 (EVEX Byte 1, bits [7-5])—consists of a EVEX.R bit field (EVEX Byte 1, bit [7]-R), EVEX.X bit field (EVEX byte 1, bit [6]-X), and 657 BEX byte 1, bit[5]-B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 610—this is the first part of the REX' field 610 and is the EVEX.R' bit field (EVEX Byte 1, bit [4]-R') that is used to encode either the upper 16 or lower 16 of the extended 32 register set. In one embodiment of the disclosure, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 715 (EVEX byte 1, bits [3:0]-mmmm)—its content encodes an implied leading opcode byte (0F, 0F 38, or 0F 3).

Data element width field 664 (EVEX byte 2, bit [7]-W)—is represented by the notation EVEX.W. EVEX.W is used to define the granularity (size) of the datatype (either 32-bit data elements or 64-bit data elements).

EVEX.vvvv 720 (EVEX Byte 2, bits [6:3]-vvvv)—the role of EVEX.vvvv may include the following: 1) EVEX.vvvv encodes the first source register operand, specified in inverted (1 s complement) form and is valid for instructions with 2 or more source operands; 2) EVEX.vvvv encodes the destination register operand, specified in 1 s complement form for certain vector shifts; or 3) EVEX.vvvv does not encode any operand, the field is reserved and should contain 1111b. Thus, EVEX.vvvv field 720 encodes the 4 low-order bits of the first source register specifier stored in inverted (1 s complement) form. Depending on the instruction, an extra different EVEX bit field is used to extend the specifier size to 32 registers.

EVEX.U 668 Class field (EVEX byte 2, bit [2]-U)—If EVEX.U=0, it indicates class A or EVEX.U0; if EVEX.U=1, it indicates class B or EVEX.U1.

Prefix encoding field 725 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 652 (EVEX byte 3, bit [7]-EH; also known as EVEX.EH, EVEX.rs, EVEX.RL, EVEX.write mask control, and EVEX.N; also illustrated with α)—as previously described, this field is context specific.

Beta field 654 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 610—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 670 (EVEX byte 3, bits [2:0]-kkk)—its content specifies the index of a register in the write mask registers as previously described. In one embodiment of the disclosure, the specific value EVEX kkk=000 has a special behavior implying no write mask is used for the particular instruction (this may be implemented in a variety of ways including the use of a write mask hardwired to all ones or hardware that bypasses the masking hardware).

Real Opcode Field 730 (Byte 4) is also known as the opcode byte. Part of the opcode is specified in this field.

MOD R/M Field 740 (Byte 5) includes MOD field 742, Reg field 744, and R/M field 746. As previously described, the MOD field's 742 content distinguishes between memory access and non-memory access operations. The role of Reg field 744 can be summarized to two situations: encoding either the destination register operand or a source register operand, or be treated as an opcode extension and not used to encode any instruction operand. The role of R/M field 746 may include the following: encoding the instruction operand that references a memory address, or encoding either the destination register operand or a source register operand.

Scale, Index, Base (SIB) Byte (Byte 6)—As previously described, the scale field's 650 content is used for memory address generation. SIB.xxx 754 and SIB.bbb 756—the contents of these fields have been previously referred to with regard to the register indexes Xxxx and Bbbb.

Displacement field 662A (Bytes 7-10)—when MOD field 742 contains 10, bytes 7-10 are the displacement field 662A, and it works the same as the legacy 32-bit displacement (disp32) and works at byte granularity.

Displacement factor field 662B (Byte 7)—when MOD field 742 contains 01, byte 7 is the displacement factor field 662B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 662B is a reinterpretation of disp8; when using displacement factor field 662B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 662B substitutes the legacy x86 instruction set 8-bit displacement. Thus, the displacement factor field 662B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 672 operates as previously described.

Full Opcode Field

FIG. 7B is a block diagram illustrating the fields of the specific vector friendly instruction format 700 that make up the full opcode field 674 according to one embodiment of the disclosure. Specifically, the full opcode field 674 includes the format field 640, the base operation field 642, and the data element width (W) field 664. The base operation field 642 includes the prefix encoding field 725, the opcode map field 715, and the real opcode field 730.

Register Index Field

FIG. 7C is a block diagram illustrating the fields of the specific vector friendly instruction format 700 that make up the register index field 644 according to one embodiment of the disclosure. Specifically, the register index field 644 includes the REX field 705, the REX' field 710, the MODR/M.reg field 744, the MODR/M.r/m field 746, the VVVV field 720, xxx field 754, and the bbb field 756.

Augmentation Operation Field

Figure 7D:
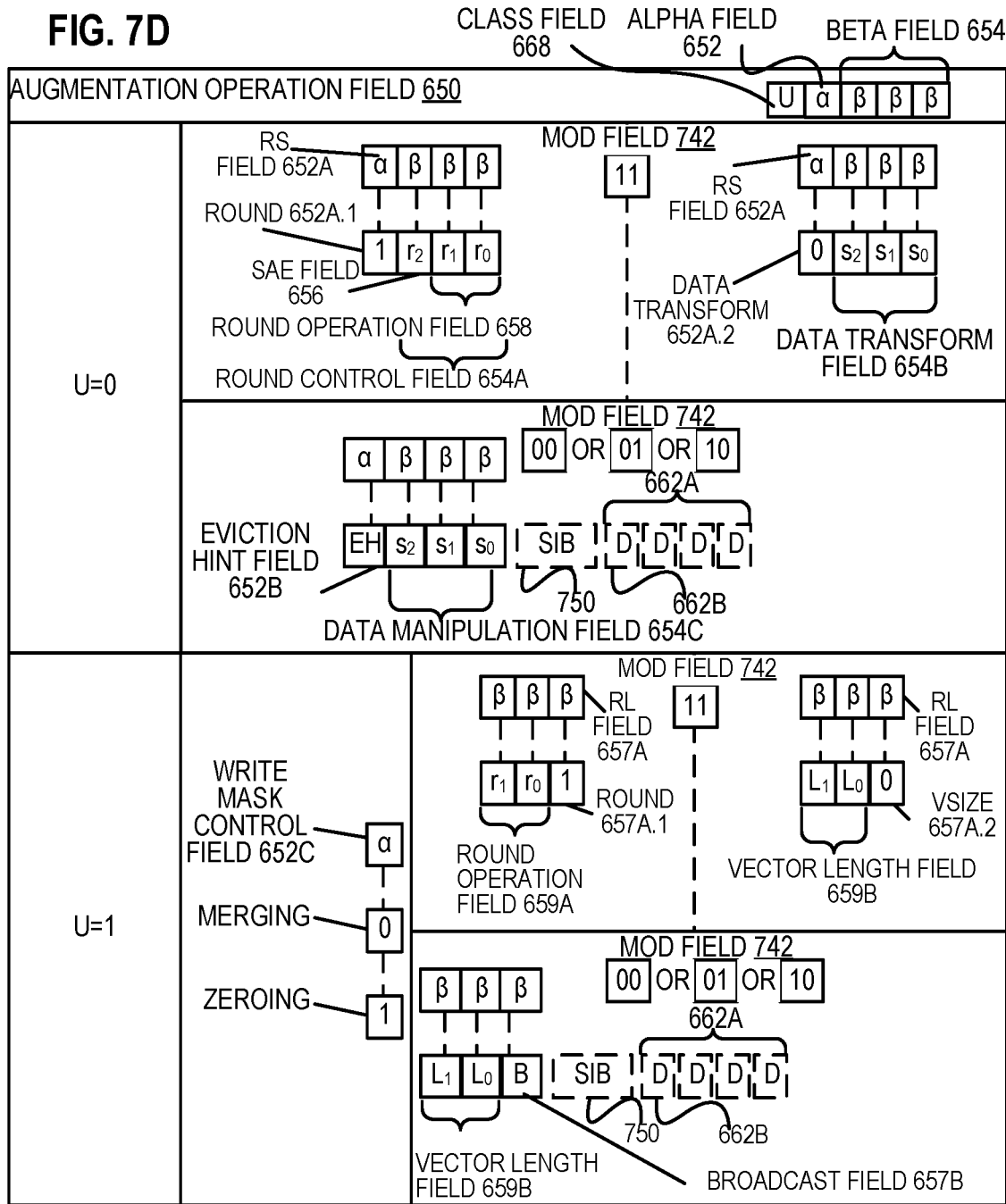
FIG. 7D is a block diagram illustrating the fields of the specific vector friendly instruction format in FIG. 7A that make up the augmentation operation field 650 according to one embodiment of the disclosure.

FIG. 7D is a block diagram illustrating the fields of the specific vector friendly instruction format 700 that make up the augmentation operation field 650 according to one embodiment of the disclosure. When the class (U) field 668 contains 0, it signifies EVEX.U0 (class A 668A); when it contains 1, it signifies EVEX.U1 (class B 668B). When U=0 and the MOD field 742 contains 11 (signifying a no memory access operation), the alpha field 652 (EVEX byte 3, bit [7]-EH) is interpreted as the rs field 652A. When the rs field 652A contains a 1 (round 652A.1), the beta field 654 (EVEX byte 3, bits [6:4]-SSS) is interpreted as the round control field 654A. The round control field 654A includes a one bit SAE field 656 and a two bit round operation field 658. When the rs field 652A contains a 0 (data transform 652A.2), the beta field 654 (EVEX byte 3, bits [6:4]-SSS) is interpreted as a three bit data transform field 654B. When U=0 and the MOD field 742 contains 00, 01, or 10 (signifying a memory access operation), the alpha field 652 (EVEX byte 3, bit [7]-EH) is interpreted as the eviction hint (EH) field 652B and the beta field 654 (EVEX byte 3, bits [6:4]-SSS) is interpreted as a three bit data manipulation field 654C.

When U=1, the alpha field 652 (EVEX byte 3, bit [7]-EH) is interpreted as the write mask control (Z) field 652C. When U=1 and the MOD field 742 contains 11 (signifying a no memory access operation), part of the beta field 654 (EVEX byte 3, bit [4]-$S_0$) is interpreted as the RL field 657A; when it contains a 1 (round 657A.1) the rest of the beta field 654 (EVEX byte 3, bit [6-5]-$S_{2-1}$) is interpreted as the round operation field 659A, while when the RL field 657A contains a 0 (VSIZE 657.A2) the rest of the beta field 654 (EVEX byte 3, bit [6-5]-$S_{2-1}$) is interpreted as the vector length field 659B (EVEX byte 3, bit [6-5]-$L_{1-0}$). When U=1 and the MOD field 742 contains 00, 01, or 10 (signifying a memory access operation), the beta field 654 (EVEX byte 3, bits [6:4]-SSS) is interpreted as the vector length field 659B (EVEX byte 3, bit [6-5]-$L_{1-0}$) and the broadcast field 657B (EVEX byte 3, bit [4]-B).

Exemplary Register Architecture

Figure 8:
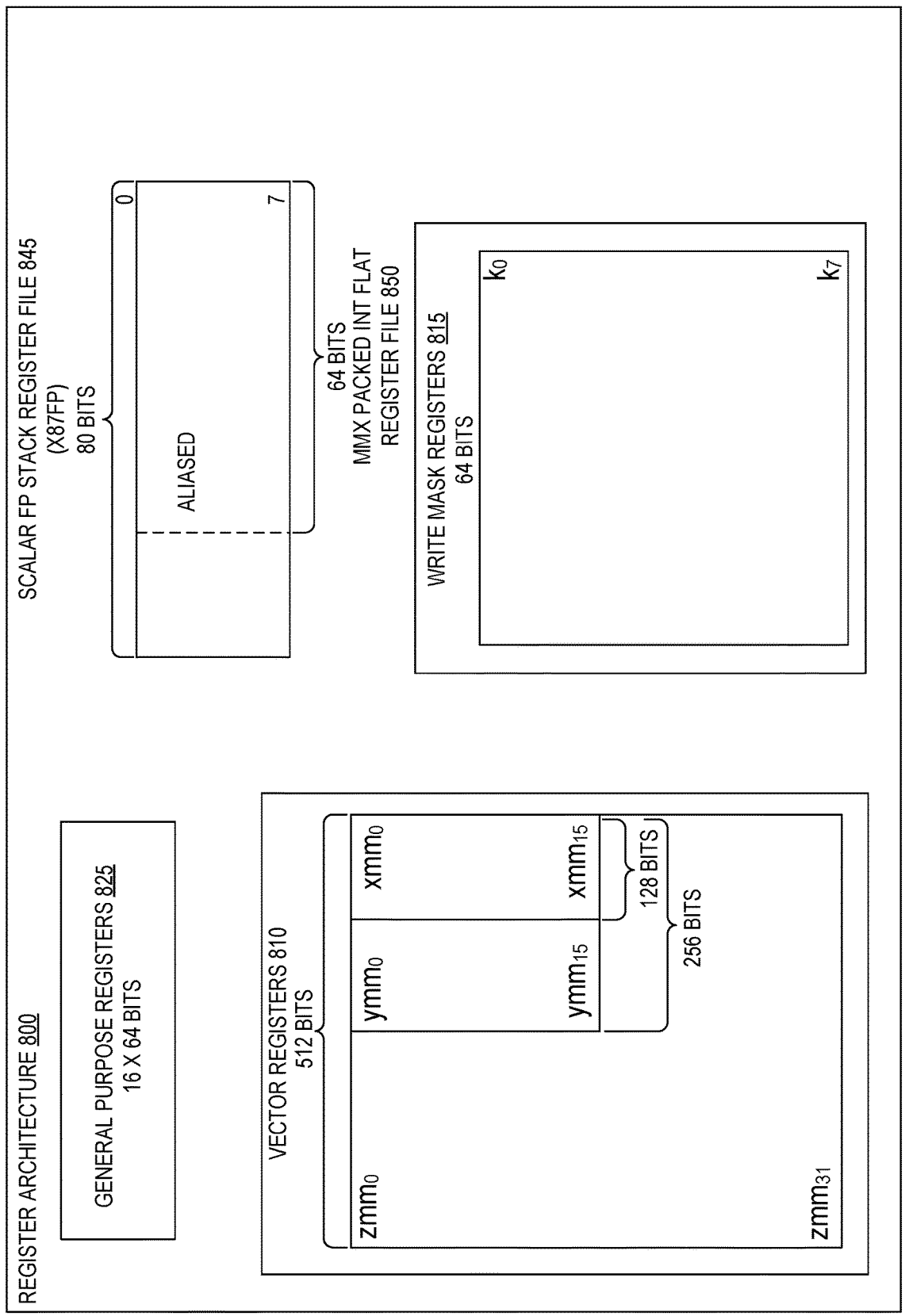
FIG. 8 is a block diagram of a register architecture according to one embodiment of the disclosure

FIG. 8 is a block diagram of a register architecture 800 according to one embodiment of the disclosure. In the embodiment illustrated, there are 32 vector registers 810 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 700 operates on these overlaid register file as illustrated in the below tables.

| Adjustable Vector Length | Class | Operations | Registers |
|---|---|---|---|
| Instruction Templates that do not include the vector length field 659B | A (FIG. 6A; U = 0) | 610, 615, 625, 630 | zmm registers (the vector length is 64 byte) |
| | B (FIG. 6B; U = 1) | 612 | zmm registers (the vector length is 64 byte) |
| Instruction templates that do include the vector length field 659B | B (FIG. 6B; U = 1) | 617, 627 | zmm, ymm, or xmm registers (the vector length is 64 byte, 32 byte, or 16 byte) depending on the vector length field 659B |

In other words, the vector length field 659B selects between a maximum length and one or more other shorter lengths, where each such shorter length is half the length of the preceding length; and instructions templates without the vector length field 659B operate on the maximum vector length. Further, in one embodiment, the class B instruction templates of the specific vector friendly instruction format 700 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 815—in the embodiment illustrated, there are 8 write mask registers (k0 through k7), each 64 bits in size. In an alternate embodiment, the write mask registers 815 are 16 bits in size. As previously described, in one embodiment of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 825—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 845, on which is aliased the MMX packed integer flat register file 850—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the disclosure may use wider or narrower registers. Additionally, alternative embodiments of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 9A is a block diagram illustrating both an exemplary in-order pipeline and an exemplary register renaming, out-of-order issue/execution pipeline according to embodiments of the disclosure. FIG. 9B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macro-instructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point—status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyper-Threading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 10B:
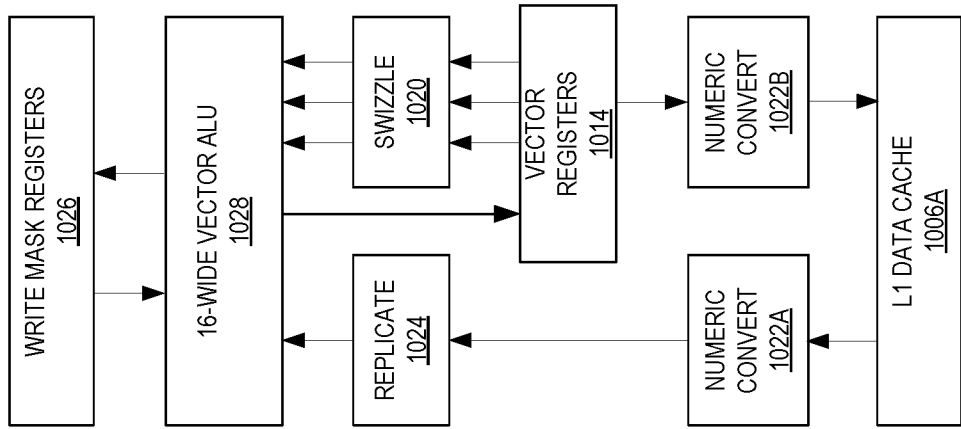
FIG. 10B is an expanded view of part of the processor core in FIG. 10A according to embodiments of the disclosure.
Figure 10A:
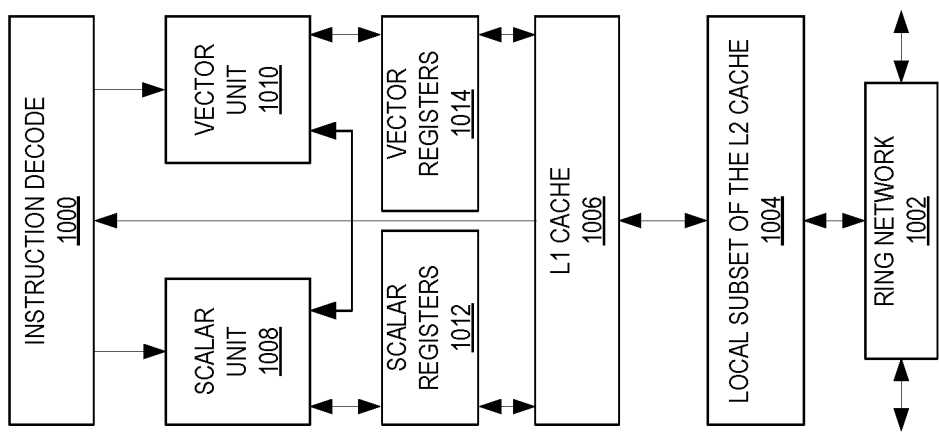
FIG. 10A is a block diagram of a single processor core, along with its connection to the on-die interconnect network and with its local subset of the Level 2 (L2) cache, according to embodiments of the disclosure.

FIGS. 10A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache 1004, according to embodiments of the disclosure. In one embodiment, an instruction decode unit 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the disclosure may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 10B is an expanded view of part of the processor core in FIG. 10A according to embodiments of the disclosure. FIG. 10B includes an L1 data cache 1006A part of the L1 cache 1004, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Figure 11:
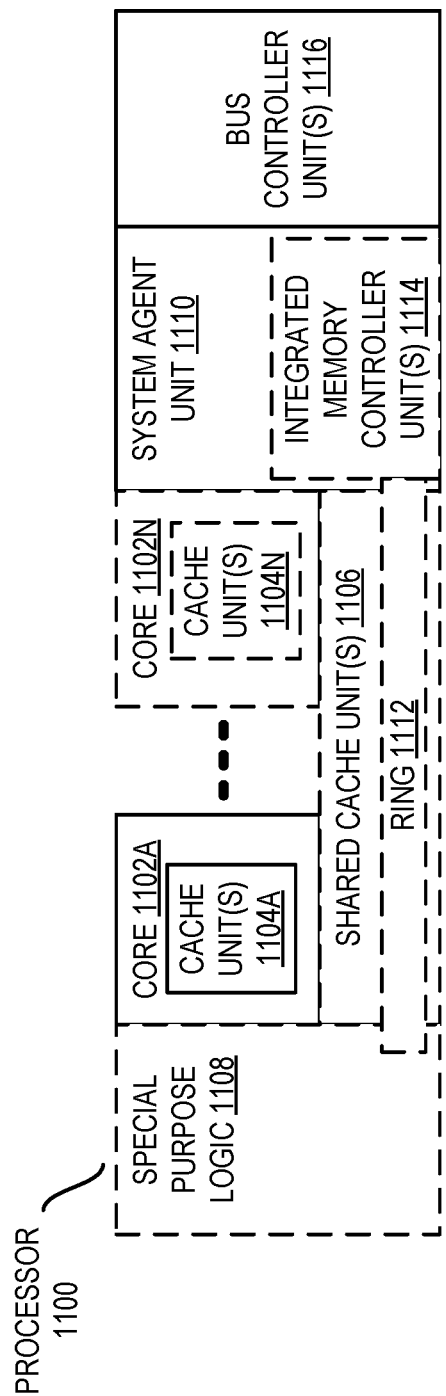
FIG. 11 is a block diagram of a processor that may have more than one core, may have an integrated memory controller, and may have integrated graphics according to embodiments of the disclosure.

FIG. 11 is a block diagram of a processor 1100 that may have more than one core, may have an integrated memory controller, and may have integrated graphics according to embodiments of the disclosure. The solid lined boxes in FIG. 11 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multithreading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution of the same instruction set, while others may be capable of executing only a subset of that instruction set or a different instruction set.

Exemplary Computer Architectures

FIGS. 12-15 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
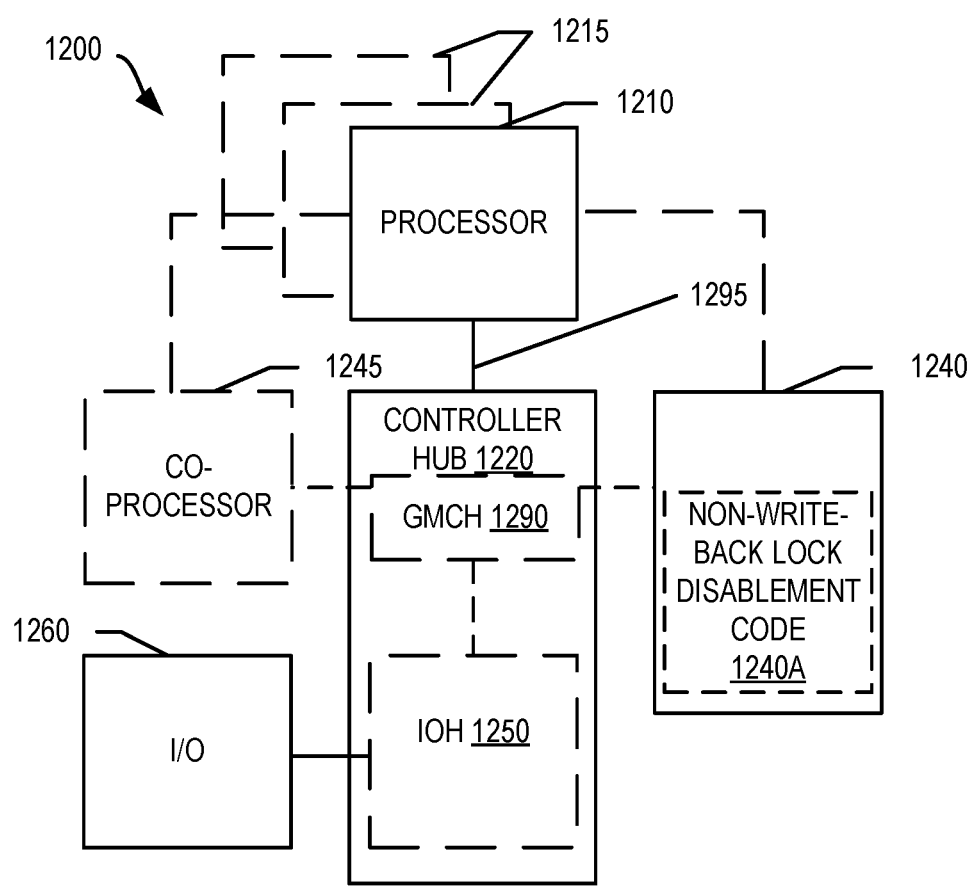
FIG. 12 is a block diagram of a system in accordance with one embodiment of the present disclosure.

Referring now to FIG. 12, shown is a block diagram of a system 1200 in accordance with one embodiment of the present disclosure. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 is couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250. Memory 1240 may include non-writeback lock disablement code 1240A, for example, to store code that when executed causes a processor to perform any method of this disclosure.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as Quickpath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
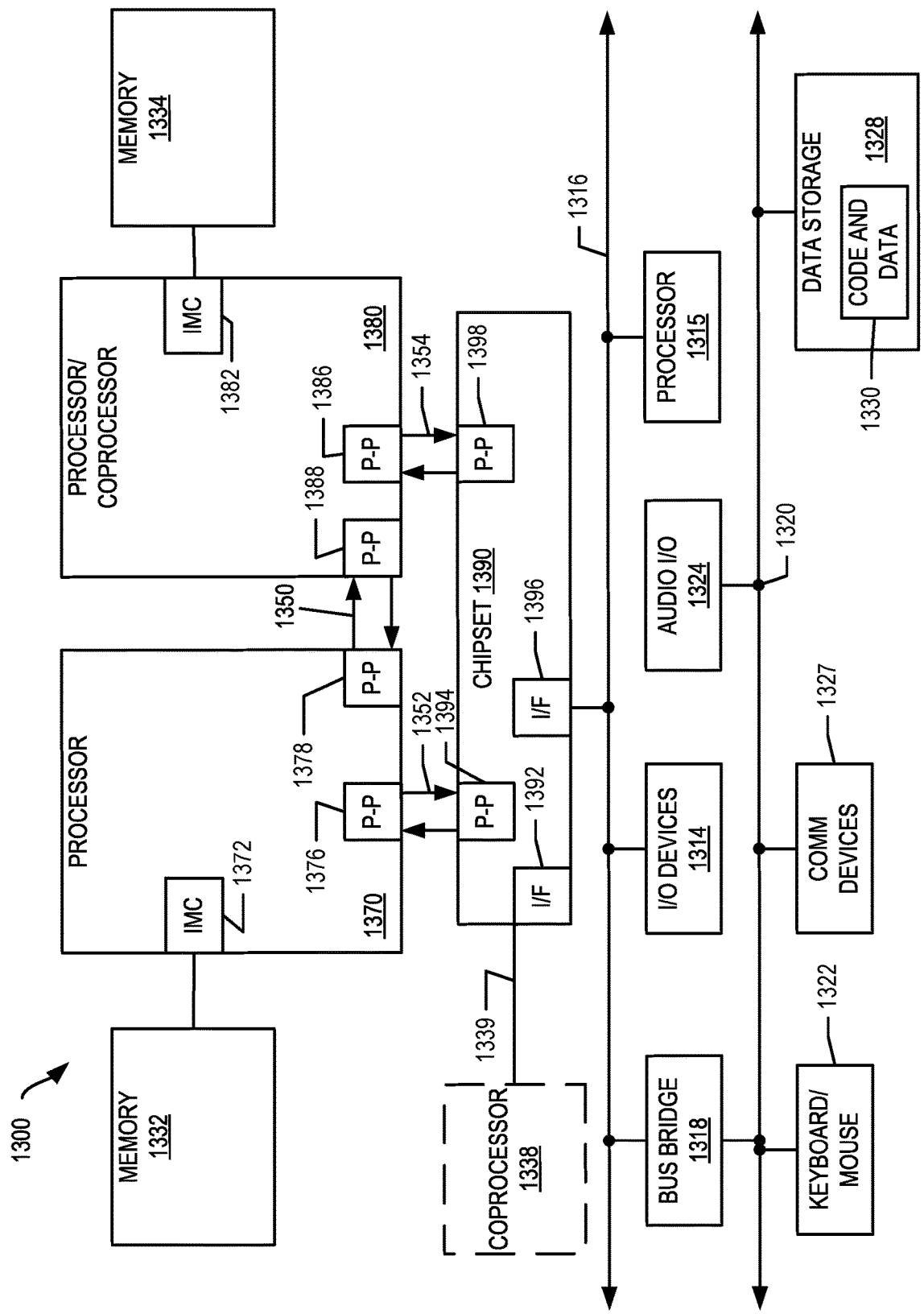
FIG. 13 is a block diagram of a more specific exemplary system in accordance with an embodiment of the present disclosure.

Referring now to FIG. 13, shown is a block diagram of a first more specific exemplary system 1300 in accordance with an embodiment of the present disclosure. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the disclosure, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present disclosure is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

Figure 14:
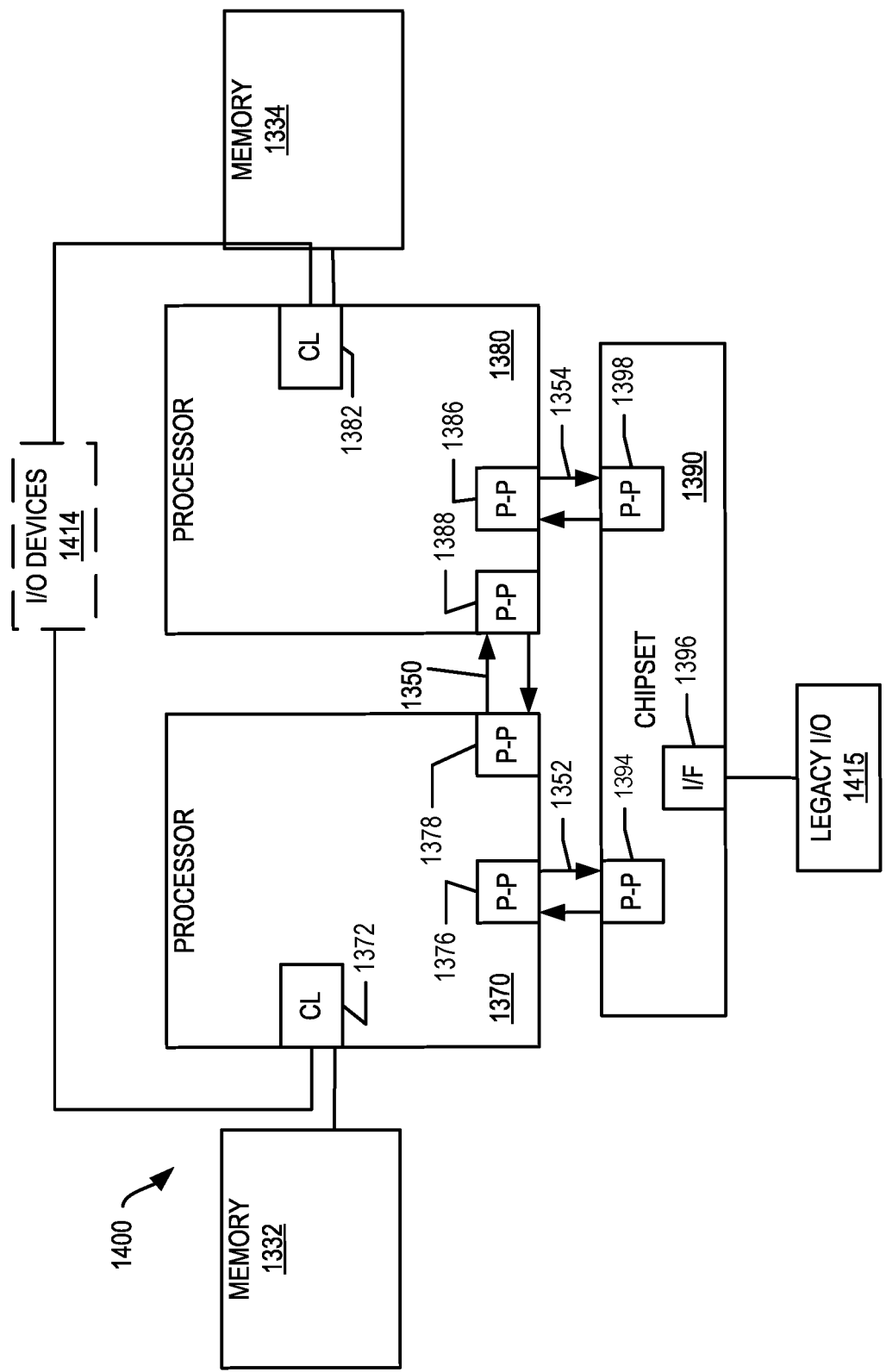
FIG. 14, shown is a block diagram of a second more specific exemplary system in accordance with an embodiment of the present disclosure.

Referring now to FIG. 14, shown is a block diagram of a second more specific exemplary system 1400 in accordance with an embodiment of the present disclosure Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1372 and 1382, respectively. Thus, the CL 1372, 1382 include integrated memory controller units and include I/O control logic. FIG. 14 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 15:
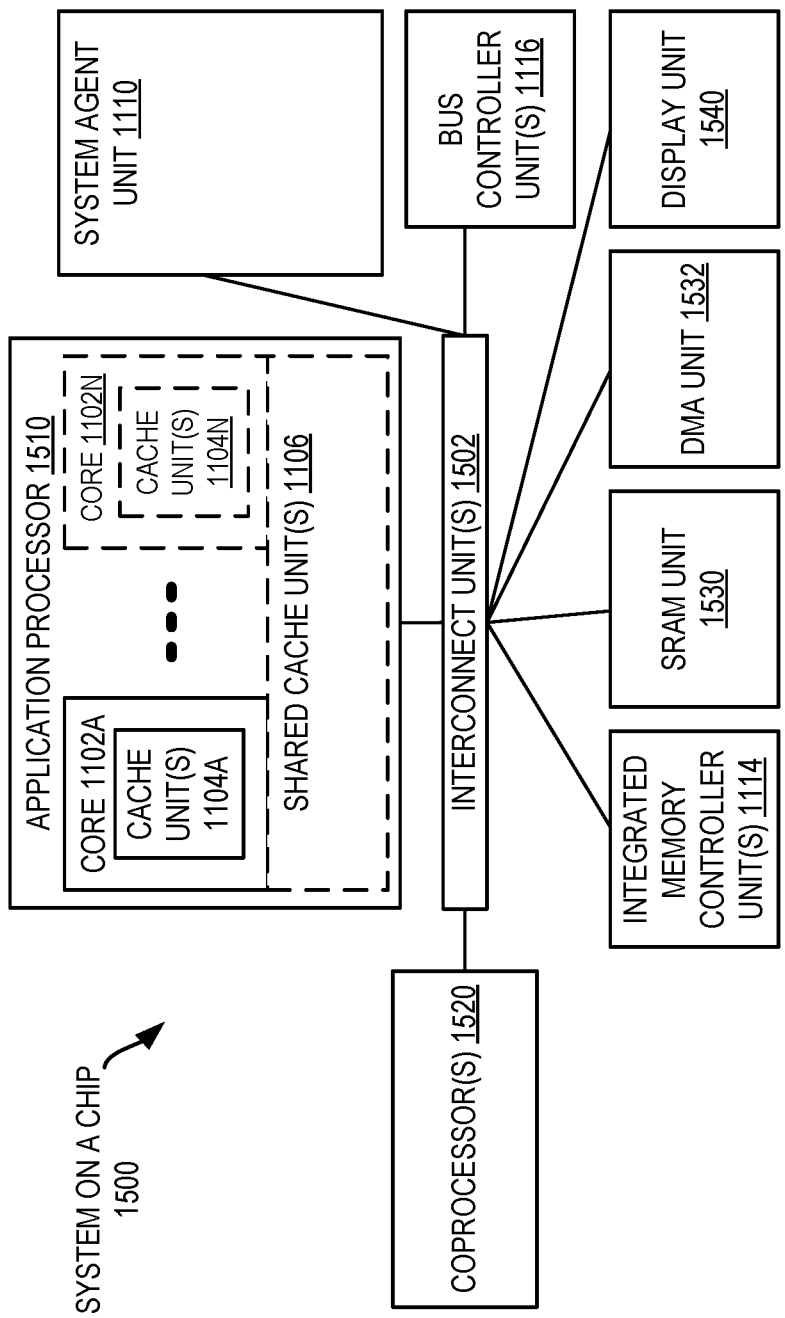
FIG. 15, shown is a block diagram of a system on a chip (SoC) in accordance with an embodiment of the present disclosure.

Referring now to FIG. 15, shown is a block diagram of a SoC 1500 in accordance with an embodiment of the present disclosure. Similar elements in FIG. 11 bear like reference numerals. Also, dashed lined boxes are optional features on more advanced SoCs. In FIG. 15, an interconnect unit(s) 1502 is coupled to: an application processor 1510 which includes a set of one or more cores 202A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 16:
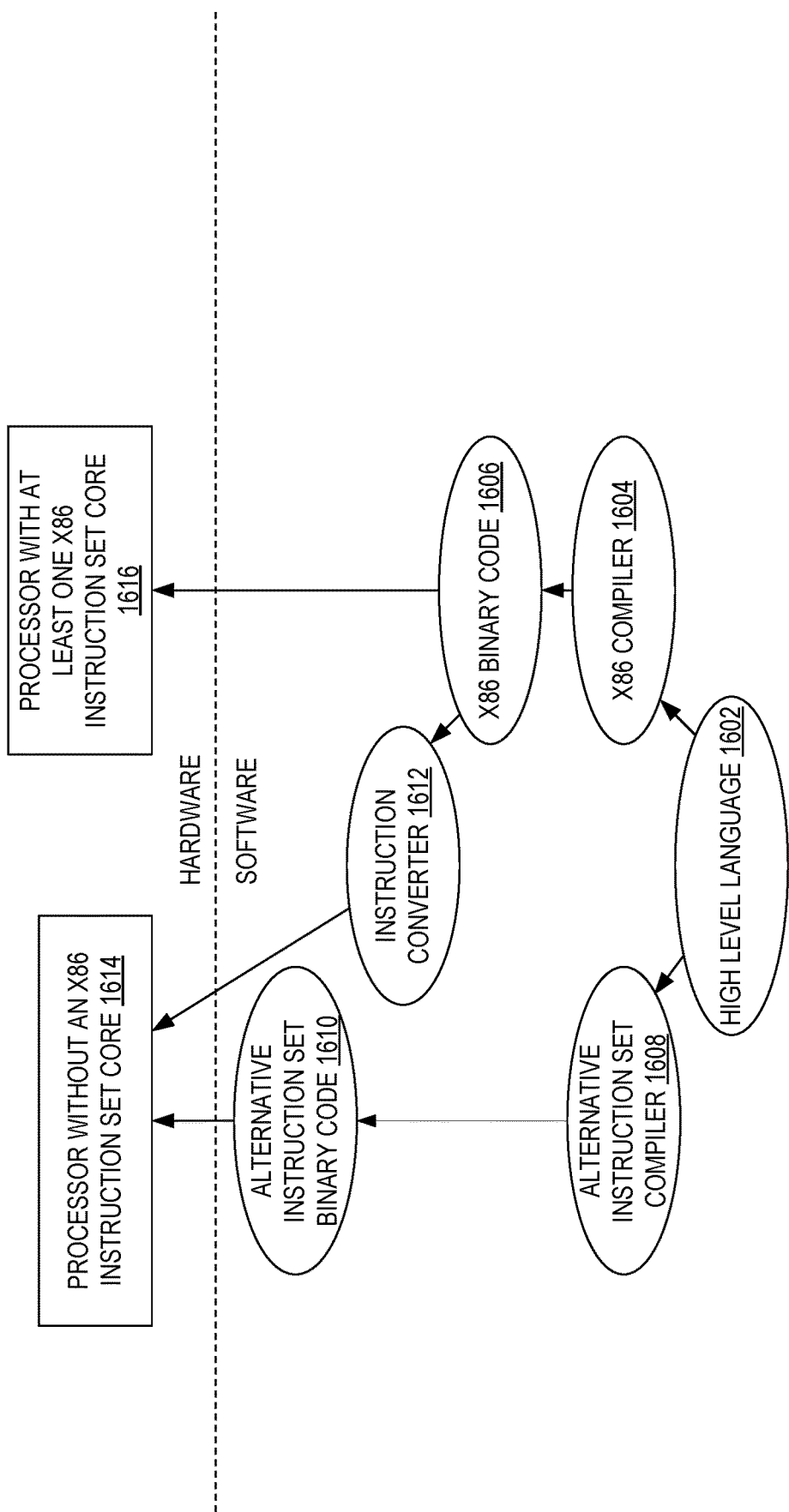
FIG. 16 is a block diagram contrasting the use of a software instruction converter to convert binary instructions in a source instruction set to binary instructions in a target instruction set according to embodiments of the disclosure.

FIG. 16 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

What is claimed is:

1. An apparatus comprising:
    a plurality of logical processors;
    a capabilities register comprising a capability bit that, when set to a first value, indicates the plurality of logical processors supports a non-write-back lock access disable feature, and, when set to a second value, indicates the plurality of logical processors does not support the non-write-back lock access disable feature;
    a control register comprising a non-write-back lock disable bit;
    a cache shared by the plurality of logical processors;
    a bus to couple the cache to a memory to service a memory request for the memory from the plurality of logical processors; and
    a memory controller to disable a non-write-back lock access of the bus for a read-modify-write type of the memory request issued by a logical processor of the plurality of logical processors when the capability bit is set to the first value and the non-write-back lock disable bit is set to a first value, and implement the non-write-back lock access of the bus for the read-modify-write type of the memory request when the non-write-back lock disable bit is set to a second value.

2. The apparatus of claim 1, wherein the memory controller is to create a general protection fault to disable the non-write-back lock access.

3. The apparatus of claim 1, wherein the control register is a memory control register.

4. The apparatus of claim 3, wherein an address of the memory control register is thirty-three hexadecimal.

5. The apparatus of claim 1, wherein the memory controller is to, when a cache disable bit is set to a value in a second control register to disable the cache, not disable the non-write-back lock access of the bus for the read-modify-write type of the memory request issued by the logical processor of the plurality of logical processors when the non-write-back lock disable bit is set to the first value.

6. The apparatus of claim 1, wherein the memory controller is to, when extended page tables are enabled and memory type is set to non-write-back, not disable the non-write-back lock access of the bus for the read-modify-write type of the memory request issued by the logical processor of the plurality of logical processors when the non-write-back lock disable bit is set to the first value.

7. The apparatus of claim 1, wherein the plurality of logical processors is a plurality of processor cores.

8. A method comprising:
    reading a capability bit of a capabilities register of a processor that indicates a plurality of logical processors supports a non-write-back lock access disable feature;

setting a non-write-back lock disable bit in a control register of the plurality of logical processors of the processor;

performing a respective operation with each of the plurality of logical processors of the processor that share a cache coupled to a memory via a bus;

receiving a memory request from a logical processor of the plurality of logical processors for the memory with a memory controller;

disabling a non-write-back lock access of the bus for a read-modify-write type of the memory request issued by the logical processor of the plurality of logical processors with the memory controller when the non-write-back lock disable bit is set to a first value; and implementing the non-write-back lock access of the bus for the read-modify-write type of the memory request with the memory controller when the non-write-back lock disable bit is set to a second value.

9. The method of claim 8, wherein the disabling the non-write-back lock access comprises generating a general protection fault.

10. The method of claim 8, wherein the control register is a memory control register.

11. The method of claim 10, wherein an address of the memory control register is thirty-three hexadecimal.

12. The method of claim 8, further comprising setting a cache disable bit in a second control register to a value to disable the cache, wherein the memory controller then does not disable the non-write-back lock access of the bus for the read-modify-write type of the memory request issued by the logical processor of the plurality of logical processors when the non-write-back lock disable bit is set to the first value.

13. The method of claim 8, further comprising enabling extended page tables for the plurality of logical processors and setting memory type to non-write-back, wherein the memory controller then does not disable the non-write-back lock access of the bus for the read-modify-write type of the memory request issued by the logical processor of the plurality of logical processors when the non-write-back lock disable bit is set to the first value.

14. The method of claim 8, wherein the plurality of logical processors is a plurality of processor cores.

15. A non-transitory machine readable medium that stores code that when executed by a machine causes the machine to perform a method comprising:

reading a capability bit of a capabilities register of a processor that indicates a plurality of logical processors supports a non-write-back lock access disable feature;

setting a non-write-back lock disable bit in a control register of the plurality of logical processors of the processor;

performing a respective operation with each of the plurality of logical processors of the processor that share a cache coupled to a memory via a bus;

receiving a memory request from a logical processor of the plurality of logical processors for the memory with a memory controller;

disabling a non-write-back lock access of the bus for a read-modify-write type of the memory request issued by the logical processor of the plurality of logical processors with the memory controller when the non-write-back lock disable bit is set to a first value; and implementing the non-write-back lock access of the bus for the read-modify-write type of the memory request with the memory controller when the non-write-back lock disable bit is set to a second value.

16. The non-transitory machine readable medium of claim 15, wherein the disabling the non-write-back lock access comprises generating a general protection fault.

17. The non-transitory machine readable medium of claim 15, wherein the control register is a memory control register.

18. The non-transitory machine readable medium of claim 17, wherein an address of the memory control register is thirty-three hexadecimal.

19. The non-transitory machine readable medium of claim 15, further comprising setting a cache disable bit in a second control register to a value to disable the cache, wherein the memory controller then does not disable the non-write-back lock access of the bus for the read-modify-write type of the memory request issued by the logical processor of the plurality of logical processors when the non-write-back lock disable bit is set to the first value.

20. The non-transitory machine readable medium of claim 15, further comprising enabling extended page tables for the plurality of logical processors and setting memory type to non-write-back, wherein the memory controller then does not disable the non-write-back lock access of the bus for the read-modify-write type of the memory request issued by the logical processor of the plurality of logical processors when the non-write-back lock disable bit is set to the first value.

21. The non-transitory machine readable medium of claim 15, wherein the plurality of logical processors is a plurality of processor cores.

\* \* \* \* \*